US011884806B2

(12) United States Patent
Inoue et al.

(10) Patent No.: US 11,884,806 B2
(45) Date of Patent: Jan. 30, 2024

(54) ETHYLENE-VINYL ALCOHOL COPOLYMER RESIN COMPOSITION, AND MULTILAYER STRUCTURE

(71) Applicant: Mitsubishi Chemical Corporation, Tokyo (JP)

(72) Inventors: Kota Inoue, Osaka (JP); Honoka Hashimoto, Osaka (JP); Nobuaki Sato, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 378 days.

(21) Appl. No.: 16/432,288

(22) Filed: Jun. 5, 2019

(65) Prior Publication Data
US 2019/0292359 A1    Sep. 26, 2019

Related U.S. Application Data

(63) Continuation of application No. PCT/JP2017/042811, filed on Nov. 29, 2017.

(30) Foreign Application Priority Data

Dec. 20, 2016 (JP) ................................. 2016-246507
Dec. 20, 2016 (JP) ................................. 2016-246509
(Continued)

(51) Int. Cl.
*C08L 29/04* (2006.01)
*C08K 3/38* (2006.01)
(Continued)

(52) U.S. Cl.
CPC ............... *C08L 29/04* (2013.01); *C08F 8/00* (2013.01); *C08K 3/38* (2013.01); *C08K 5/005* (2013.01);
(Continued)

(58) Field of Classification Search
CPC .. C08L 29/04; C08K 3/38; C08K 5/09; C08K 5/20; C08K 2003/387; C08K 5/005;
(Continued)

(56) References Cited

U.S. PATENT DOCUMENTS 5,744,547 A    4/1998 Moritani et al.
6,232,382 B1    5/2001 Ninomiya et al.
(Continued)

FOREIGN PATENT DOCUMENTS

CN    1261605 A    8/2000
CN    1289798 A    4/2001
(Continued)

OTHER PUBLICATIONS

Singaporean Search Report issued in SG Patent Application No. 11201905135T, dated Jul. 2, 2020.
(Continued)

*Primary Examiner* — Callie E Shosho
*Assistant Examiner* — Krupa Shukla
(74) *Attorney, Agent, or Firm* — GREENBLUM & BERNSTEIN, P.L.C.

(57) ABSTRACT

A resin composition contains an ethylene-vinyl alcohol copolymer, wherein the ratio (Y/Z) of a lactone ring content (Y) to the sum (Z) of a carboxylic acid content (X) and the lactone ring content (Y) in terminal structures of the ethylene-vinyl alcohol copolymer is not less than 55 mol %, and at least one of a cinnamic acid component, a lubricant, a boron compound, and a conjugated polyene compound is present as a thermally stabilizing substance in a predetermined proportion based on the weight of the resin composition. Therefore, the resin composition is excellent in high-temperature thermal decomposition suppressing effect and thermal stability, and is free from odor emanation and coloration even if being processed at a higher temperature.

20 Claims, 2 Drawing Sheets

(30) Foreign Application Priority Data

| Dec. 20, 2016 | (JP) | 2016-246510 |
| Dec. 20, 2016 | (JP) | 2016-246511 |
| Mar. 10, 2017 | (JP) | 2017-045641 |
| Mar. 10, 2017 | (JP) | 2017-045643 |
| Mar. 10, 2017 | (JP) | 2017-045644 |
| Mar. 10, 2017 | (JP) | 2017-045645 |

(51) Int. Cl.
- *C08K 5/00* (2006.01)
- *C08K 5/01* (2006.01)
- *C08K 5/09* (2006.01)
- *C08F 8/00* (2006.01)

(52) U.S. Cl.
CPC .............. *C08K 5/01* (2013.01); *C08K 5/09* (2013.01); *C08K 2003/387* (2013.01)

(58) Field of Classification Search
CPC ......... C08K 5/01; B32B 15/08; B32B 15/082; B32B 27/306
See application file for complete search history.

(56) References Cited

U.S. PATENT DOCUMENTS

| 6,242,087 | B1 | 6/2001 | Kawai |
| 6,472,470 | B1 | 10/2002 | Fujiwara et al. |
| 6,576,704 | B2 | 6/2003 | Nagao et al. |
| 9,951,199 | B2 | 4/2018 | Nonaka et al. |
| 2003/0060550 | A1 | 3/2003 | Inomata et al. |
| 2003/0096101 | A1 | 5/2003 | Kazeto |
| 2005/0009987 | A1 | 1/2005 | Imura et al. |
| 2007/0106031 | A1 | 5/2007 | Uchiumi et al. |
| 2013/0017383 | A1 | 1/2013 | Tai et al. |
| 2013/0040087 | A1 | 2/2013 | Kazeto et al. |
| 2015/0210788 | A1 | 7/2015 | Okamoto et al. |
| 2016/0108193 | A1 | 4/2016 | Kawai et al. |
| 2016/0229987 | A1 | 8/2016 | Kawai et al. |
| 2016/0243746 | A1 | 8/2016 | Kawai |
| 2016/0251500 | A1 | 9/2016 | Kawai |
| 2018/0194876 | A1* | 7/2018 | Yoshida ............ B32B 7/04 |
| 2018/0208750 | A1 | 7/2018 | Komuro et al. |
| 2019/0100610 | A1 | 4/2019 | Sato |
| 2019/0300632 | A1* | 10/2019 | Inoue ............ C08F 8/16 |

FOREIGN PATENT DOCUMENTS

| CN | 102906186 A | 1/2013 |
| CN | 105579350 | 5/2016 |
| CN | 105579525 A | 5/2016 |
| CN | 105722760 A | 6/2016 |
| EP | 3395841 | 10/2018 |
| EP | 3560983 | 10/2019 |
| JP | S53-102357 A | 9/1978 |
| JP | 53-119958 | 10/1978 |
| JP | H09-071620 A | 3/1997 |
| JP | H11-106592 A | 4/1999 |
| JP | 11-292929 | 10/1999 |
| JP | 2000-177068 A | 6/2000 |
| JP | 2000-351811 A | 12/2000 |
| JP | 2001-163921 | 6/2001 |
| JP | 2001-164059 A | 6/2001 |
| JP | 2001-164070 | 6/2001 |
| JP | 2002-80606 | 3/2002 |
| JP | 2003-176395 | 6/2003 |
| JP | 2003-327619 | 11/2003 |
| JP | 2004-292677 | 10/2004 |
| JP | 2005-054013 A | 3/2005 |
| JP | 2014-034647 A | 2/2014 |
| JP | 2015-059216 A | 3/2015 |
| JP | 2015-071439 | 4/2015 |
| JP | 2015-083377 | 4/2015 |
| TW | 200500203 A | 1/2005 |
| WO | 2004/092234 | 10/2004 |
| WO | 2011/125739 A1 | 10/2011 |
| WO | 2013/005807 | 1/2013 |
| WO | 2015/050222 | 4/2015 |
| WO | 2016/199827 A1 | 12/2016 |
| WO | 2017/047559 | 3/2017 |
| WO | 2017/110752 | 6/2017 |
| WO | 2018/116766 | 6/2018 |

OTHER PUBLICATIONS

International Search Report issued in International Patent Application No. PCT/JP2017/042811, dated Jan. 23, 2018.
IPRP in International patent application No. PCT/JP2017/042811 dated Jul. 4, 2019 (English translation).
Office Action issued in Japan Patent Application No. 2017-228707, dated May 25, 2021, English translation.
Office Action issued in Japanese Patent Application No. 2017-228708, dated May 25, 2021, English translation.
Office Action issued in Japanese Patent, Application No. 2017-228709, dated May 25, 2021, English translation.
Chinese Office Action, Chinese Patent Application No. 201780073047.2, dated Apr. 25, 2021, English translation.
Singaporean Search Report, Singapore Patent Application No. 11201905135T, dated Jun. 18, 2021.
Office Action issued in TW Patent Application No. 106141503, dated Mar. 10, 2021, English translation.
European Search Report issued in European Patent Application Application No. 17882876.0 dated Nov. 26, 2019.

\* cited by examiner

ETHYLENE-VINYL ALCOHOL COPOLYMER RESIN COMPOSITION, AND MULTILAYER STRUCTURE

RELATED APPLICATION

This application is a continuation of International Application No. PCT/JP2017/042811, filed on Nov. 29, 2017, which claims priority to Japanese Patent Application No. 2016-246507, 2016-246509, 2016-246510, and 2016-246511 filed on Dec. 20, 2016, and 2017-045641, 2017-045643, 2017-045644, and 2017-045645 filed on Mar. 10, 2017, the entire contents of each of which being hereby incorporated by reference.

TECHNICAL FIELD

The present disclosure relates to an ethylene-vinyl alcohol copolymer resin composition. More specifically, the present disclosure relates to an ethylene-vinyl alcohol copolymer resin composition excellent in heat stability at a higher temperature as well as gas barrier property, and to a multilayer structure produced by using the resin composition.

BACKGROUND ART

Ethylene-vinyl alcohol copolymers (hereinafter sometimes abbreviated as "EVOH"), particularly, saponified ethylene-vinyl acetate copolymers, are excellent in gas barrier property, mechanical strength, and other properties and, therefore, are widely used for films, sheets, containers, fibers and other various applications.

Saponified ethylene-vinyl acetate copolymers are produced by copolymerizing ethylene and vinyl acetate, removing unreacted vinyl acetate, and saponifying the resulting ethylene-vinyl acetate copolymer.

A variety of products are formed from such an EVOH by melt-forming processes such as extrusion and injection molding. In the melt forming of the EVOH, the melt forming temperature is high, typically 200° C. or higher. Therefore, the EVOH is susceptible to thermal degradation, so that the resulting formed product is liable to have a poorer quality with fisheyes and gel-like objects (spots).

An exemplary method for suppressing the thermal degradation of the EVOH at a higher temperature is proposed, in which the total content of a carboxylic acid unit and a lactone ring unit at polymer terminals of the EVOH is controlled to not higher than 0.12 mol 3 based on the total content of an ethylene unit, a vinyl alcohol unit, and a vinyl ester unit of the EVOH (see, for example, PTL 1).

RELATED ART DOCUMENT

Patent Document

PTL 1: WO2004/092234

SUMMARY

The art disclosed in PTL 1 provides a certain thermal degradation-suppressing effect, but the effect is not satisfactorily proved because films sampled after a lapse of 50 hours were evaluated for occurrence of gel-like objects therein by visual inspection. With recent technological advancement, the EVOH requires further improvement. For example, there is a demand for an EVOH that is excellent in thermal decomposition suppressing effect even at a higher temperature and is free from odor emanation and coloration even if being processed at the higher temperature.

In order to meet the demand, the present disclosure provides an EVOH resin composition that is excellent in thermal stability and thermal decomposition suppressing effect even at a higher temperature and is free from odor emanation and coloration even if being processed at the higher temperature, and provides a multilayer structure produced by using the EVOH resin composition.

In view of the foregoing, the inventors conducted intensive studies and, as a result, found that an EVOH resin composition that contains an EVOH having a lactone ring content greater than a carboxylic acid content in its terminal structures, and further contains a limited small amount of at least one component selected from the group consisting of a cinnamic acid component, a lubricant, a boron compound, and a conjugated polyene compound (hereinafter sometimes referred to collectively as "thermally stabilizing substance") can serve as an ingredient that is excellent in thermal stability and free from odor emanation and coloration even if being processed at a higher temperature.

According to a first aspect of the present disclosure, there is provided an EVOH resin composition that contains: an EVOH; and at least one component (thermally stabilizing substance) selected from the group consisting of:
(A) not greater than 500 ppm of a cinnamic acid component based on the weight of the resin composition;
(B) not greater than 300 ppm of a lubricant based on the weight of the resin composition;
(C) not greater than 400 ppm of a boron compound on a boron basis based on the weight of the resin composition; and
(D) not greater than 800 ppm of a conjugated polyene compound based on the weight of the resin composition,
wherein the EVOH comprises monomer units including at least an ethylene unit and a vinyl alcohol unit, and a carboxylic acid group and a lactone ring present in terminal structures thereof, and the ratio (Y/Z) of a lactone ring content (Y) to the sum (Z) of a carboxylic acid content (X) and the lactone ring content (Y) is not less than 55 mol %.

According to a second aspect of the present disclosure, there is provided a multilayer structure that includes at least one layer comprising the EVOH resin composition.

In the EVOH resin composition of the present disclosure, the EVOH has a lactone ring content ratio (Y/Z) of not less than 55 mol % with respect to the sum (Z) of the carboxylic acid content (X) and the lactone ring content (Y) in the EVOH terminal structures. In addition, the resin composition contains a limited proportion of the specific thermally stabilizing substance. With this arrangement, the EVOH is excellent in high-temperature thermal stability, so that the EVOH resin composition is free from odor emanation and coloration even if being processed at a higher temperature.

Where the sum (Z) of the carboxylic acid content (X) and the lactone ring content (Y) is 0.01 to 0.3 mol % based on the total amount of the monomer units of the EVOH, the EVOH is particularly excellent in thermal stability.

Where the lactone ring content (Y) is 0.01 to 0.3 mol % based on the total amount of the monomer units of the EVOH, the EVOH is further superior in thermal stability.

Where the carboxylic acid content (X) is 0.01 to 0.3 mol % based on the total amount of the monomer units of the EVOH, the EVOH is even more superior in thermal stability.

The multilayer structure of the present disclosure has at least one layer comprising the EVOH resin composition of the present disclosure excellent in thermal stability. Therefore, the multilayer structure is excellent in thermal stability, and is advantageous in that the quality thereof is less liable to be thermally influenced.

DESCRIPTION OF EMBODIMENTS

Figure 1:
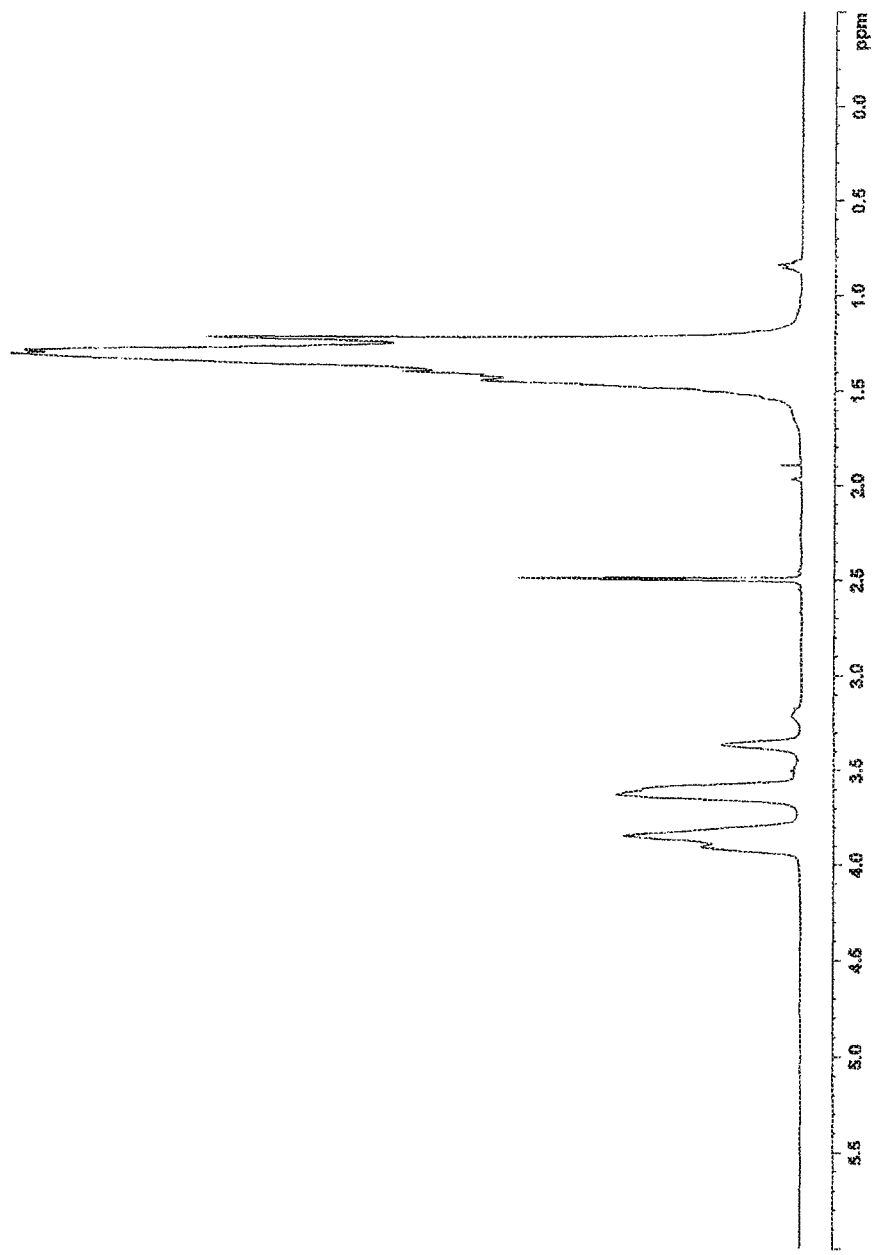
FIG. 1 is a typical $^1$H-NMR chart of an EVOH in a DMSO-D6 solvent.

Embodiments of the present disclosure will hereinafter be described in detail. It should be understood that the present disclosure be not limited to the following embodiments.

According to a first feature, the EVOH resin composition of the present disclosure contains the EVOH that has a lactone ring content ratio (Y/Z) of not less than 55 mol % with respect to the sum (Z) of the carboxylic acid content (X) and the lactone ring content (Y) in the EVOH terminal structures. According to a second feature, the resin composition contains a limited proportion of the specific thermally stabilizing substance (at least one component selected from the group consisting of the cinnamic acid component, the lubricant, the boron compound, and the conjugated polyene compound).

More specifically, the lactone ring is chemically more stable than the carboxylic acid group and, accordingly, is less susceptible to a decomposition reaction during heating. Therefore, the lactone ring supposedly ensures further superior thermal stability than the carboxylic acid group at a higher temperature.

In the present disclosure, where the cinnamic acid component is used in a limited amount as the thermally stabilizing substance, the lactone ring more effectively provides the high-temperature thermal stabilization effect for the following reason. The cinnamic acid component is a kind of acid, which supposedly promotes a crosslinking reaction. Therefore, it is considered that the crosslinking reaction and the decomposition reaction of the lactone ring during the heating are competitively balanced in the presence of the cinnamic acid component in the EVOH resin composition. Therefore, the EVOH resin composition of the present disclosure containing the cinnamic acid component is supposedly further superior in high-temperature thermal stability, because the decomposition reaction of the lactone ring at the higher temperature is further suppressed. However, it was found that, if the amount of the cinnamic acid component is even slightly greater than the aforementioned limited amount, the resin composition conversely has poorer high-temperature thermal stability because the decomposition reaction and the crosslinking reaction are unbalanced and the cinnamic acid component significantly promotes the crosslinking reaction. Therefore, the proportion of the cinnamic acid component should be not greater than 500 ppm ("ppm" is based on weight, and this definition also applies to the following description).

In the present disclosure, where the lubricant is used in a limited amount as the thermally stabilizing substance, the lactone ring more effectively provides the high-temperature thermal stabilization effect for the following reason. The lubricant is conventionally used to ensure proper formability of a resin material. However, it is considered that, when the lubricant is exposed to a higher temperature, a limited amount of a decomposition product is generated and attacks the lactone ring structure of the EVOH to decompose the lactone ring. Therefore, it was confirmed that, even if the lactone ring content is higher than the carboxylic acid content in the EVOH, the presence of a greater amount of the lubricant makes it difficult to provide the high-temperature thermal stabilization effect. In the present disclosure, therefore, the proportion of the lubricant is controlled to not greater than 300 ppm within a range that does not impair the formability of the EVOH resin composition to suppress the decomposition reaction of the lactone ring, thereby allowing the lactone ring to sufficiently provide the high-temperature thermal stabilization effect.

In the present disclosure, where the boron compound is used in a limited amount as the thermally stabilizing substance, the lactone ring more effectively provides the high-temperature thermal stabilization effect for the following reason. The boron compound is conventionally often used for a resin material. If the resin composition contains a greater amount of the boron compound, however, the lactone ring experiences a reverse equilibrium reaction to be decomposed into a carboxylic acid and an alcohol, and interaction between the alcohol and the boron compound is liable to inhibit restoration of the lactone ring from the decomposition. Therefore, it is considered that the greater amount of the boron compound consequently reduces the lactone ring content of the resin composition to impair the high-temperature thermal stability. In the present disclosure, therefore, the proportion of the boron compound is controlled to not greater than 400 ppm on a boron basis to suppress the decomposition reaction of the lactone ring, thereby allowing the lactone ring to sufficiently provide the high-temperature thermal stabilization effect.

In the present disclosure, where the conjugated polyene compound is used in a limited amount as the thermally stabilizing substance, the lactone ring more effectively provides the high-temperature thermal stabilization effect for the following reason. The conjugated polyene structure of the conjugated polyene compound functions to trap radicals generated during heating at a higher temperature. Therefore, it is considered that the conjugated polyene compound contributes to the high-temperature thermal stabilization effect of the lactone ring. However, it was found that, if the amount of the conjugated polyene compound is excessively great, gel-like objects occurring in the resin due to long-term stagnation of the resin during extrusion are liable to be colored at the higher temperature. In the present disclosure, therefore, the proportion of the conjugated polyene compound is controlled to not greater than 800 ppm to suppress the coloration of the gel-like objects to a practically non-problematic level during the heating at the higher temperature and to allow the lactone ring to sufficiently provide the high-temperature thermal stabilization effect.

The EVOH resin composition of the present disclosure will hereinafter be described.

The EVOH to be used for the EVOH resin composition of the present disclosure is typically a resin prepared by copolymerizing ethylene and a vinyl ester monomer, and then saponifying the resulting copolymer, or a water-insoluble thermoplastic resin generally referred to as an ethylene-vinyl alcohol copolymer or a saponified ethylene-vinyl ester copolymer. A known polymerization method such as solution polymerization method, suspension polymerization method or emulsion polymerization method may be utilized for polymerization for the preparation of the EVOH. In general, a solution polymerization method using a lower alcohol such as methanol or ethanol as a solvent, particularly preferably using methanol as a solvent, is utilized. The saponification of the resulting ethylene-vinyl ester copolymer may be achieved by a known method.

In general, the EVOH mainly contains an ethylene structural unit and a vinyl alcohol structural unit, and further contains a small amount of a vinyl ester structural unit left unsaponified as required.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The EVOH typically has an ethylene structural unit content of 20 to 60 mol %, preferably 25 to 50 mol %, particularly preferably 25 to 35 mol %, as measured in conformity with ISO14663. If the ethylene structural unit content is excessively low, the EVOH tends to be poorer in high-humidity gas barrier property and melt formability for gas barrier applications. If the ethylene structural unit content is excessively high, on the other hand, the EVOH tends to be poorer in gas barrier property.

The saponification degree of the vinyl ester component in the EVOH is typically 90 to 100 mol %, preferably 95 to 100 mol %, particularly preferably 99 to 100 mol %, as measured in conformity with JIS K6726 (with the use of a solution obtained by homogenously dissolving the EVOH in a water/methanol solvent). If the saponification degree is excessively low, the EVOH tends to be poorer in gas barrier property, thermal stability, humidity resistance, and the like.

Further, the EVOH typically has a melt flow rate (MFR) of 0.5 to 100 g/10 minutes, preferably 1 to 50 g/10 minutes, particularly preferably 2 to 35 g/10 minutes, as measured at 210° C. with a load of 2160 g. If the MFR is excessively high, the EVOH tends to have unstable film formability. If the MFR is excessively low, the EVOH tends to have an excessively high viscosity, making melt extrusion difficult.

The EVOH may further contain a structural unit derived from any of the following comonomers in an amount (e.g., not greater than 10 mol %) that does not impair the effects of the present disclosure.

The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products of these hydroxyl-containing α-olefins such as 3,4-diacyloxy-1-butene (e.g., 3,4-diacetoxy-1-butene, and the like), and acylation products of these hydroxyl-containing α-olefins such as 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxyalkyl vinylidenes such as 2-methylenepropane-1,3-diol and 3-methylenepentane-1,5-diol; vinylidene diacetates such as 1,3-diacetoxy-2-methylenepropane, 1,3-dipropionyloxy-2-methylenepropane, and 1,3-dibutyronyloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids having a carbon number of 1 to 18; acrylamide compounds such as acrylamide, N-alkyl acrylamides having a carbon number of 1 to 18, N,N-dimethyl acrylamide, 2-acrylamidopropane sulfonic acid and its salts, and acrylamidopropyldimethylamine and its acid salts and quaternary salts; methacrylamide compounds such as methacrylamide, N-alkyl methacrylamides having a carbon number of 1 to 18, N,N-dimethyl methacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers, hydroxyalkyl vinyl ethers, and alkoxyalkyl vinyl ethers having a carbon number of 1 to 18; halogenated vinyl compounds such as vinyl chloride, vinylidene chloride, vinyl fluoride, vinylidene fluoride, and vinyl bromide; vinylsilanes such as trimethoxyvinylsilane; allyl acetate, halogenated allyl compounds such as allyl chloride, and allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

A post-modified EVOH such as an urethanized, acetalized, cyanoethylated or oxyalkylenated EVOH may be used as the EVOH of the present disclosure.

Particularly, an EVOH prepared by copolymerization with a hydroxyl-containing α-olefin is preferred because of its excellent secondary formability, and an EVOH containing a primary hydroxyl group in its side chain is preferred. Particularly, an EVOH having a 1,2-diol structure in its side chain is preferred.

The EVOH having the 1,2-diol structure in its side chain contains a 1,2-diol structural unit in its side chain. An EVOH containing a structural unit represented by the following structural formula (1) is most preferred.

(1)

Particularly, where the EVOH contains the 1,2-diol structural unit, the content of the 1,2-diol structural unit is typically 0.1 to 20 mol %, preferably 0.5 to 15 mol %, particularly preferably 1 to 10 mol %.

In general, the EVOH contains the lactone ring or the carboxylic acid group present in its terminal structures. According to the first feature, as previously described, the EVOH to be used for the EVOH resin composition of the present disclosure has a lactone ring content ratio (Y/Z) of not less than 55 mol % with respect to the sum (Z) of the carboxylic acid content (X) and the lactone ring content (Y) in the EVOH terminal structures.

In the present disclosure, the lactone ring is present in a greater amount than the carboxylic acid group in the EVOH terminal structures. Thus, the EVOH is excellent in high-temperature thermal stability, and is free from odor emanation and coloration even if being processed at the higher temperature.

In the present disclosure, the lactone ring content ratio (Y/Z) is preferably not less than 55 mol %, more preferably 56 to 90 mol %, particularly preferably 57 to 80 mol %, especially preferably 58 to 70 mol %, further preferably 60 to 70 mol %, for the high-temperature thermal stability. If the content ratio (Y/Z) is excessively low, the EVOH tends to be poorer in thermal stability. If the content ratio is excessively high, the EVOH tends to be poorer in adhesion to an adhesive resin layer when being used for a multilayer structure.

In the present disclosure, the sum (Z) of the carboxylic acid content (X) and the lactone ring content (Y) in the EVOH terminal structures is preferably 0.01 to 0.3 mol %, more preferably 0.03 to 0.28 mol %, still more preferably 0.05 to 0.25 mol %, especially preferably 0.1 to 0.24 mol %, particularly preferably 0.17 to 0.23 mol %, based on the total amount of the monomer units of the EVOH for thermal stability. If the sum (Z) is excessively small, the EVOH tends to be poorer in adhesion to the adhesive resin layer when being used for the multilayer structure. If the sum (Z) is excessively great, the EVOH tends to be poorer in thermal stability.

The monomer units herein include an ethylene unit represented by the following structural formula (2), a vinyl alcohol unit represented by the following structural formula (3), a vinyl acetate unit represented by the following structural formula (4), and other copolymerized monomer units, and the total amount of the monomer units means the total molar amount of these monomer units.

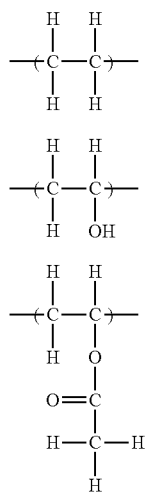

The carboxylic acid content (X) is preferably 0.01 to 0.3 mol % for thermal stability, particularly preferably 0.02 to 0.25 mol %, more preferably 0.03 to 0.2 mol %, especially preferably 0.05 to 0.1 mol %, particularly preferably 0.05 to 0.08 mol %, based on the total amount of the monomer units of the EVOH. If the carboxylic acid content (X) is excessively low, the EVOH tends to be poorer in adhesion to the adhesive resin layer when being used for the multilayer structure. If the carboxylic acid content (X) is excessively high, the EVOH tends to be poorer in thermal stability.

The lactone ring content (Y) is preferably 0.01 to 0.3 mol % for thermal stability, particularly preferably 0.02 to 0.25 mol %, more preferably 0.03 to 0.2 mol %, especially preferably 0.05 to 0.15 mol %, particularly preferably 0.1 to 0.15 mol %, based on the total amount of the monomer units of the EVOH. If the lactone ring content (Y) is excessively low, the EVOH tends to be poorer in adhesion to the adhesive resin layer when being used for the multilayer structure. If the lactone ring content (Y) is excessively high, the EVOH tends to be poorer in thermal stability.

The carboxylic acid content (X), the lactone ring content (Y) and the lactone ring content ratio (Y/Z) are determined by NMR measurement. The carboxylic acid group herein includes carboxylic acid groups and carboxylic acid salt groups, and the carboxylic acid content (X) means the total content of the carboxylic acid groups and the carboxylic acid salt groups.

The NMR measurement is performed in the following manner.

<Measurement Conditions>
Apparatus: Bruker's AVANCE III
Measurement frequency: 400 MHz
Solvent: Heavy water/ethanol-D6 (having a heavy water/ethanol weight ratio of 35/65), and DMSO (dimethyl sulfoxide)-D6
Polymer concentration: 5 wt. %
Measurement temperatures: 70° C. for heavy water/ethanol-D6, and 50° C. for DMSO-D6
Integration number: 16
Pulse recurrence time: 4 seconds
Sample rotation speed: 20 Hz
Additive: Trifluoroacetic acid
<Analysis Method>

(1-1) Measurement of Terminal Methyl Amount

The terminal methyl amount is calculated based on $^1$H-NMR measurement (measurement with DMSO-D6 at 50° C.). More specifically, the terminal methyl amount is calculated from the following expression (Ex. 1) by using an integration value ($I_{Me-1}$) of a peak appearing between 0.7 and 0.95 ppm for terminal methyl, an integration value ($I_{CH2}$) of peaks appearing between 0.95 and 1.85 ppm for non-terminal methylene (a total integration value of peaks for methylene in the ethylene unit, the vinyl alcohol unit, and the vinyl acetate unit), an integration value ($I_{OAc}$) of a peak appearing between 1.9 and 2 ppm for terminal methyl in the vinyl acetate unit, and an integration value ($I_{CH}$) of peaks appearing between 3.1 and 4.3 ppm for methine in the vinyl alcohol unit as shown in a chart of FIG. 1.

Terminal methyl amount(mol %)=$(I_{Me-1}/3)/[(I_{Me-1}/3)+(I_{OAc}/3)+I_{CH}+\{I_{CH2}-2\times I_{CH}-2\times (I_{OAc}/3)-2\times (I_{Me-1}/3)\}/4]$ (Ex. 1)

(1-2) Measurement of Carboxylic Acid Content (X) and Lactone Ring Content (Y)

The contents of the carboxylic acid group and the lactone ring present at polymer terminals are calculated based on the terminal methyl amount (mol %) obtained in the item (1-1) and $^1$H-NMR measurement (measurement with a heavy water/ethanol-D6 solvent at 70° C.). More specifically, the carboxylic acid content (X) (mol %) and the lactone ring content (Y) (mol %) are calculated from the following expressions (Ex. 2) and (Ex. 3), respectively, by using an integration value ($I_{Me-2}$) of a peak appearing between 0.7 and 1 ppm for terminal methyl, an integration value ($I_x$) of a peak appearing between 2.15 and 2.32 ppm, and an integration value ($I_y$) of a peak appearing between 2.5 and 2.7 ppm as shown in a chart of FIG. 2.

Carboxylic acid content($X$)(mol %)=Terminal methyl amount(mol %)×$(I_x/2)/(I_{Me-2}/3)$ (Ex. 2)

Lactone ring content($Y$)(mol %)=Terminal methyl amount(mol %)×$(I_y/2)/(I_{Me-2}/3)$ (Ex. 3)

(1-3) Calculation of Lactone Ring Content Ratio (Y/Z) with respect to Sum (Z) of Carboxylic Acid Content (X) and Lactone Ring Content (Y) in Terminal Structures The lactone ring content ratio (Y/Z) is calculated from the following expression (Ex. 4) based on the carboxylic acid content (X) and the lactone ring content (Y) calculated above.

Lactone ring content ratio$(Y/Z)$(mol %) with respect to sum$(Z)$ of carboxylic acid content$(X)$ and lactone ring content$(Y)$(mol %)=$\{Y/(X+Y)\} \times 100$  (Ex. 4)

In an EVOH production process including a saponifying step [I] of saponifying the ethylene-vinyl ester copolymer to provide an EVOH intermediate product, a chemical treatment step [II] of chemically treating the EVOH intermediate product with a chemical treatment liquid, and a drying step [III] of drying the chemically treated EVOH intermediate product, exemplary methods for controlling the lactone ring content ratio (Y/Z) to not less than 55 mol % with respect to the sum (Z) of the carboxylic acid content (X) and the lactone ring content (Y) in the EVOH terminal structures in the present disclosure include: (1) a method in which a higher drying temperature is employed in the drying step [III]; (2) a method in which a longer drying period is employed in the drying step [III]; and (3) a method in which a chemical treatment liquid having a higher carboxylic acid concentration is used as the chemical treatment liquid in the chemical treatment step [II]. These methods (1) to (3) may be used alone or in combination.

Particularly, in the production process including the saponifying step [I] of saponifying the ethylene-vinyl ester copolymer to provide the EVOH intermediate product, the chemical treatment step [II] of chemically treating the EVOH intermediate product with the chemical treatment liquid, and the drying step [III] of drying the chemically treated EVOH intermediate product, the carboxylic acid concentration of the chemical treatment liquid is preferably controlled at a higher level in the following manner in the method (3). More specifically, it is preferred, for the high-temperature thermal stability, that a carboxylic acid and a carboxylic acid metal salt are used in combination as chemical treatment agents for the chemical treatment liquid, that the carboxylic acid concentration of the chemical treatment liquid is controlled at a higher level, and that the weight-based concentration ratio between the carboxylic acid concentration and the metal ion concentration of the carboxylic acid metal salt (carboxylic acid concentration/metal ion concentration) is controlled to not less than 3.7.

The EVOH production process to be employed in the present disclosure will hereinafter be described in detail.

In the saponifying step [I], the ethylene-vinyl ester copolymer prepared by the copolymerization of ethylene and the vinyl ester monomer is saponified by a generally known method.

At this stage, the saponified ethylene-vinyl ester copolymer (EVOH intermediate product) may be pelletized, and the resulting pellets may be subjected to the chemical treatment step [II] and the drying step [III] to be described below.

A conventionally known method may be used for the pelletization of the EVOH intermediate product. Exemplary methods for the pelletization include: a hot cutting method including the steps of extruding the EVOH intermediate product in a melted state from an extrusion head, cutting the extruded EVOH intermediate product in a melted state, and cooling and solidifying the resulting pieces of the extruded EVOH intermediate product into pellets; and a strand cutting method including the steps of extruding a resin solution or slurry of the EVOH intermediate product (EVOH hydrous composition) into a solidification bath, cooling and solidifying the extruded EVOH intermediate product, and cutting the resulting EVOH strands.

The shape of the pellets generally depends upon the pellet production method, and may be any of various shapes including cylindrical shape, spherical shape, rugby ball-like shape, cubic shape, square prism shape, irregular shape, and the like. The size of the pellets may be properly controlled by the diameter of the nozzle of the extruder to be used, the number of cutter blades, the rotation speed of the cutter blades, and the like.

In the chemical treatment step [II], the EVOH intermediate product is chemically treated with the chemical treatment liquid containing the chemical treatment agents. This step is performed to impart the EVOH with thermal stability and adhesiveness. Various compounds are usable as the chemical treatment agents, and examples of the compounds include carboxylic acids and inorganic acids such as phosphoric acid, and esters and metal salts of the carboxylic acids and the inorganic acids. These compounds are generally soluble in water. The chemical treatment liquid is an aqueous solution containing any of these compounds.

Specific examples of the carboxylic acids to be used as the chemical treatment agents include acetic acid, propionic acid, butyric acid, and stearic acid. For thermal stability, C1 to C4 aliphatic carboxylic acids are preferred, and C1 to C4 aliphatic monovalent carboxylic acids are more preferred. Particularly, acetic acid is preferred. Examples of the inorganic acids include carbonic acid and sulfuric acid in addition to phosphoric acid. However, the chemical treatment agents exclude the lubricant, the boric acid compound, and the conjugated polyene compound to be used in the present disclosure.

Examples of the metal salts of the carboxylic acids and the inorganic acids include salts of alkali metals, salts of alkali earth metals, and salts of d-block metals of the fourth period of the Periodic Table. Examples of the alkali metals include sodium and potassium. Examples of the alkali earth metals include calcium and magnesium. Examples of the d-block metals of the fourth period of the Periodic Table include titanium, manganese, copper, cobalt, and zinc. The alkali metal salts are preferred, and the sodium salts and the potassium salts are particularly preferred.

Examples of the carboxylic acid metal salts include: alkali metal salts of the carboxylic acids including alkali metal acetates such as sodium acetate and potassium acetate, alkali metal propionates such as sodium propionate and potassium propionate, and alkali metal stearates such as sodium stearate and potassium stearate; and alkali earth metal salts of the carboxylic acids including alkali earth metal acetates such as magnesium acetate and calcium acetate, alkali earth metal propionates such as magnesium propionate and calcium propionate, and alkali earth metal stearates such as magnesium stearate and calcium stearate.

Examples of the inorganic acid metal salts include: alkali metal salts of the inorganic acids including alkali metal phosphates such as sodium phosphate and potassium phosphate; and alkali earth metal salts of the inorganic acids including alkali earth metal phosphates such as magnesium phosphate and calcium phosphate. The phosphates herein include hydrogenphosphates. These metal salts may be used alone or in combination.

For the thermal stability, the carboxylic acids and the metal salts of the carboxylic acids are preferred as the chemical treatment agents. Further, the carboxylic acids, the metal salts of the carboxylic acids, the inorganic acids, and the metal salts of the inorganic acids are preferred as the chemical treatment agents. More specifically, acetic acid, the metal acetates and the phosphates are preferred.

In order to uniformly and speedily incorporate any of the aforementioned compounds as the chemical treatment agents to the EVOH intermediate product, the EVOH intermediate product preferably has a water content of 20 to 80 wt. %. When the EVOH intermediate product is treated in contact with the chemical treatment liquid, the content of the compound may be adjusted by controlling the concentration of the compound in the aqueous solution, the period of the contact treatment, the temperature for the contact treatment, the stirring speed in the contact treatment, and the water content of the EVOH intermediate product to be treated.

In the chemical treatment step [II], the weight-based concentration ratio of the carboxylic acid concentration to the metal ion concentration of the carboxylic acid metal salt in the chemical treatment liquid (carboxylic acid concentration/metal ion concentration) is preferably not less than 3.7, particularly preferably not less than 13, more preferably not less than 22, further preferably not less than 25, especially preferably not less than 30, for the high-temperature thermal stability. If the ratio is excessively low, the EVOH tends to be poorer in thermal stability. The upper limit of the ratio is typically 100, preferably 50.

The chemical treatment step [II] of chemically treating the EVOH intermediate product with the chemical treatment liquid may be a single-stage chemical treatment step in which a chemical treatment liquid containing the carboxylic acid in a higher concentration is used, or may be a multi-stage chemical treatment step in which a plurality of chemical treatment liquids containing the carboxylic acid in different concentrations are used. The expression "the weight-based concentration ratio of the carboxylic acid concentration to the metal ion concentration of the carboxylic acid metal salt in the chemical treatment liquid (carboxylic acid concentration/metal ion concentration) is not less than 3.7" in the chemical treatment step [II] means that the weight-based concentration ratio of the carboxylic acid concentration to the metal ion concentration of the carboxylic acid metal salt (carboxylic acid concentration/metal ion concentration) is not less than 3.7 in the chemical treatment liquid containing the carboxylic acid in the higher concentration for use in the single-stage chemical treatment step. The above expression also means that the weight-based concentration ratio of the carboxylic acid concentration to the metal ion concentration of the carboxylic acid metal salt (carboxylic acid concentration/metal ion concentration) is not less than 3.7 in a chemical treatment liquid containing the carboxylic acid in the highest concentration among the plurality of chemical treatment liquids for use in the multi-stage chemical treatment step as will be described later.

For efficient production of the EVOH excellent in thermal stability, the multi-stage chemical treatment step is preferred in which the plural chemical treatment liquids having different carboxylic acid concentrations are used for the respective chemical treatments. The multi-stage chemical treatment step for the chemical treatment step [II] of chemically treating the EVOH intermediate product with the chemical treatment liquid is performed in the following manner. First, the plural chemical treatment liquids having different carboxylic acid concentrations are prepared. Then, the EVOH intermediate product is chemically treated on multiple stages by using the plural chemical treatment liquids for the respective chemical treatments in the multi-stage chemical treatment step. In this case, the weight-based concentration ratio of the carboxylic acid concentration to the metal ion concentration of the carboxylic acid metal salt (carboxylic acid concentration/metal ion concentration) is preferably not less than 3.7 in the chemical treatment liquid having the highest carboxylic acid concentration among the plurality of chemical treatment liquids.

In the present disclosure, the carboxylic acid concentration of the chemical treatment liquid is preferably 1 to 50,000 ppm, particularly preferably 10 to 10,000 ppm, especially preferably 400 to 5,000 ppm. The metal ion concentration of the carboxylic acid metal salt is preferably 1 to 50,000 ppm, particularly preferably 10 to 10,000 ppm, for treatment efficiency and costs.

In the present disclosure, the term "carboxylic acid concentration" means the concentration of the carboxylic acid contained as the chemical treatment agent in the chemical treatment liquid. Where acetic acid is contained as the carboxylic acid, for example, the carboxylic acid concentration means the concentration of acetic acid in the chemical treatment liquid. Further, the term "the metal ion concentration of the carboxylic acid metal salt" means the concentration of metal ions of the carboxylic acid metal salt contained as the chemical treatment agent in the chemical treatment liquid. Where sodium acetate is contained in the chemical treatment liquid, for example, the metal ion concentration of the carboxylic acid metal salt means the concentration of sodium ions. Where carboxylic acid and a carboxylic acid metal salt are used in combination as the chemical treatment agents, carboxyl ions contained in the carboxylic acid metal salt are not counted in the carboxylic acid concentration. Where acetic acid and sodium acetate are used in combination as the chemical treatment agents, acetate ions contained in sodium acetate are not counted in the carboxylic acid concentration.

In the chemical treatment step [II], the treatment temperature is typically 10° C. to 100° C., preferably 15° C. to 80° C., more preferably 20° C. to 60° C. If the treatment temperature is excessively low, it will be difficult to incorporate a predetermined amount of an acid or an acid salt into the EVOH intermediate product. If the treatment temperature is excessively high, it will be difficult to handle the solution, resulting in disadvantageous production.

In the chemical treatment step [II], the treatment period is typically not shorter than 1 hour, preferably 1.5 to 48 hours, more preferably 2 to 24 hours. If the treatment period is excessively short, the EVOH intermediate product tends to suffer from uneven color and/or poorer thermal stability. If the treatment period is excessively long, the EVOH intermediate product tends to be colored.

In the drying step [III], the chemically treated EVOH intermediate product is dried. For the drying conditions, the drying temperature is preferably 80° C. to 150° C., more preferably 90° C. to 140° C., particularly preferably 100° C. to 130° C. If the drying temperature is excessively low, the drying period tends to be prolonged. If the drying temperature is excessively high, the EVOH intermediate product tends to be colored. The drying period is preferably not shorter than 3 hours, more preferably not shorter than 5 hours, particularly preferably not shorter than 8 hours. If the drying period is excessively short, the EVOH intermediate product tends to be insufficiently dried. The upper limit of the drying period is typically 1,000 hours.

Various drying processes are usable for the drying. Exemplary drying processes include a fluidized drying process in which the chemically-treated substantially-pelletized EVOH intermediate product is dried while being agitated and spread mechanically or by hot air, and a stationary drying process in which the chemically-treated substantially-pelletized EVOH intermediate product is dried without dynamic motions such as the agitation and the spreading. Exemplary dryers for the fluidized drying process include drum/groove type agitation dryer, round pipe dryer, rotary dryer, fluid bed dryer, vibrating fluid bed dryer, and conical rotor type dryer. Exemplary dryers for the stationary drying process include non-material-moving type dryers such as batch box type dryer, and material-moving type dryers such as band dryer, tunnel dryer, and vertical dryer. The fluidized drying process and the stationary drying process may be used in combination for the drying. In the present disclosure, it is preferred to perform the fluidized drying process and then the stationary drying process for suppression of fusion sticking of the chemically treated EVOH intermediate product.

The drying process will be described in greater detail.

In the fluidized drying process, air or an inert gas (e.g., nitrogen gas, helium gas, argon gas or the like) is used as a heating gas. The temperature of the heating gas is properly selected from a range of 40° C. to 150° C. according to the volatile content of the chemically treated EVOH intermediate product. In consideration of the fact that the chemically treated EVOH intermediate product is liable to suffer from the fusion sticking at a higher temperature, the temperature of the heating gas is preferably 40° C. to 100° C., more preferably 40° C. to 90° C. Further, the flow speed of the heating gas in the dryer is preferably 0.7 to 10 m/second, more preferably 0.7 to 5 m/second, particularly 1 to 3 m/second. If the flow speed is excessively low, the chemically treated EVOH intermediate product is liable to suffer from the fusion sticking. If the flow speed is excessively high, on the other hand, the chemically treated EVOH intermediate product is liable to be chipped or broken into particles. The period for the fluidized drying process depends upon the amount of the chemically treated EVOH intermediate product to be dried, but is typically 5 minutes to 36 hours, preferably 10 minutes to 24 hours. After the chemically treated EVOH intermediate product is subjected to the fluidized drying process under the aforementioned conditions, the EVOH preferably has a volatile content of 5 to 60 wt. %, more preferably 10 to 55 wt. %. If the volatile content is excessively high, the chemically treated EVOH intermediate product is liable to suffer from the fusion sticking in the subsequent stationary drying process. An excessively low volatile content is not industrially preferred because of a greater energy loss. In the fluidized drying process, the volatile content is preferably reduced by not less than 5 wt. %, more preferably 10 to 45 wt. %, as compared with the volatile content before the process. If the reduction in the volatile content is excessively small, minute fisheyes are liable to occur in a product melt-formed from the EVOH intermediate product.

After the chemically treated EOVH intermediate product is dried under the aforementioned conditions, the EVOH intermediate product preferably has a water content of 0.001 to 5 wt. %, particularly preferably 0.01 to 2 wt. %, more preferably 0.1 to 1 wt %. If the water content is excessively low, the EVOH tends to be poorer in long-run formability. If the water content is excessively high, the EVOH tends to suffer from foaming in the extrusion.

The chemically treated EVOH intermediate product thus prepared typically has a melt flow rate (MFR) of 0.1 to 100 g/10 minutes, particularly preferably 0.5 to 50 g/10 minutes, more preferably 1 to 30 g/10 minutes (as measured at 210° C. with a load of 2160 g). If the melt flow rate is excessively low, it will be difficult to extrude the EVOH due to a higher torque in the extruder during the extrusion. If the melt flow rate is excessively high, a product formed from the EVOH through a heat-stretching process tends to be poorer in appearance and gas barrier property.

The MFR of the EVOH intermediate product may be controlled by controlling the polymerization degree of the EVOH intermediate product or by adding a crosslinking agent or a plasticizer to the EVOH intermediate product.

According to the second feature, the EVOH resin composition of the present disclosure is the resin composition that contains the EVOH prepared in the aforementioned manner, and further contains at least one component selected as the thermally stabilizing substance from the group consisting of:

(A) not greater than 500 ppm of the cinnamic acid component based on the weight of the resin composition;

(B) not greater than 300 ppm of the lubricant based on the weight of the resin composition;

(C) not greater than 400 ppm of the boron compound on a boron basis based on the weight of the resin composition; and (D) not greater than 800 ppm of the conjugated polyene compound based on the weight of the resin composition.

<<(A) Use of Cinnamic Acid Component as Thermally Stabilizing Substance>>

The use of the cinnamic acid component as the thermally stabilizing substance in the present disclosure will be described.

The cinnamic acid component content is not higher than 500 ppm based on the weight of the overall resin composition. It is particularly effective that the cinnamic acid component content is very low. If the cinnamic acid component content is higher than 500 ppm, the thermal stability of the EVOH resin composition cannot be improved, but is conversely liable to be deteriorated. The cinnamic acid component content is more preferably not higher than 450 ppm, particularly preferably not higher than 400 ppm. The lower limit of the cinnamic acid component content is typically 5 ppm, preferably 10 ppm, particularly preferably 50 ppm. If the cinnamic acid component content is excessively low, the thermal stability improving effect of the cinnamic acid component tends to be insufficient.

The cinnamic acid component content is based on the weight of the EVOH resin composition that is an EVOH resin composition as a final product containing the cinnamic acid component or containing the cinnamic acid component and optional additives.

Exemplary methods for incorporating the specific amount of the cinnamic acid component to the EVOH resin composition include: (1) a method in which the EVOH intermediate product (pellets) prepared so as to have a lactone ring content ratio (Y/Z) of not less than 55 mol % with respect to the sum (Z) of the carboxylic acid content (X) and the lactone ring content (Y) in the EVOH terminal structures is immersed in a solution (e.g., an aqueous solution, a methanol solution or the like) containing the cinnamic acid component, whereby the cinnamic acid component is incorporated to the EVOH intermediate product; (2) a method in which the cinnamic acid component is added to the EVOH intermediate product (pellets), and the resulting mixture is melted in an extruder or the like; (3) a method in which the cinnamic acid component is added in a powdery form or in a solution form directly to the EVOH intermediate product (pellets) and mixed with the EVOH intermediate product; and (4) a method in which the cinnamic acid component is incorporated to an ethylene-vinyl ester copolymer solution before the saponification of the EVOH.

Examples of the cinnamic acid component to be used in the present disclosure include cinnamic acid, and cinnamic acid derivatives such as cinnamic alcohol, cinnamic acid esters, and cinnamic acid salts, among which cinnamic acid is most preferably used.

The cinnamic acid component content of the cinnamic acid-containing EVOH resin composition of the present disclosure is measured, for example, through the following procedure by liquid chromatography mass spectrometry (LC/MS/MS). In the following procedure, cinnamic acid is used as the cinnamic acid component by way of example. Where a cinnamic acid derivative (e.g., a cinnamic acid salt) is used, the measurement may be performed by the same procedure.

<Determination of Cinnamic Acid Component Content>
[Preparation of Standard Solutions]

Cinnamic acid (10.89 mg) is weighed in a 10-mL measuring flask, and dissolved in methanol to provide a 10-mL solution (standard stock solution having a concentration of 1,089 μg/mL). Then, the standard stock solution thus prepared is diluted with methanol to provide mixed standard solutions respectively having concentrations of 0.109 μg/mL, 0.218 μg/mL, 0.545 μg/mL, 1.09 μg/mL, and 2.18 μg/mL. A calibration line is prepared by performing the LC/MS/MS analysis on these mixed standard solutions.

[Preparation of Sample Solution]
(1) After pellets (1 g) of the EVOH resin composition of the present disclosure are weighed in a 10-mL measuring flask, 9 mL of methanol is added to the flask.
(2) The resulting solution is ultrasonically treated for 120 minutes, and cooled to a room temperature (25° C.).
(3) Methanol is added to this solution to a volume of 10 mL (sample solution (I)).
(4) Then, 1 mL of the sample solution (I) is put in a 10-mL measuring flask, and diluted with methanol to a volume of 10 mL (sample solution (II)).
(5) The sample solution (I) or the sample solution (II) is filtered by a PTFE filter (0.45 μm), and the resulting liquid is used as a measurement solution for the LC/MS/MS analysis.

The detection concentration of cinnamic acid is calculated based on a peak area value detected by the LC/MS/MS analysis and the calibration line prepared by using the standard solutions.

[LC/MS/MS Measurement Conditions]
LC system: LC-20A (available from Shimadzu Corporation)
Mass spectrometer: API4000 (AB/MDS Sciex)
Analysis column: Scherzo SM-C18 (3.0×75 mm, 3 μm)
Column temperature: 45° C.
Mobile phase: A. 10 mmol/L ammonium acetate aqueous solution
B. Methanol
Time program: 0.0 to 5.0 minutes B (%)=30% to 95.
5.0 to 10.0 minutes B (%)=95%
10.1 to 15.0 minutes B (%)=30%
Flow rate: 0.4 mL/minute
Switch valve: 2.0 to 6.0 minutes to MS
Injection amount: 5 μL
Ionization: ESI method
Detection: Negative ion detection (SRM method)
Ion monitoring: Q1=147.0 to Q3=102.9 (CE: −15 eV)

In order to significantly enhance the thermal stability improving effect of the cinnamic acid component, it is particularly preferred that the lactone ring content ratio (Y/Z) with respect to the sum (Z) of the carboxylic acid content (X) and the lactone ring content (Y) in the EVOH terminal structures is not less than 63 mol % in the present disclosure. This is supposedly because, with a higher lactone ring content ratio, the crosslinking reaction by the cinnamic acid component and the decomposition reaction of the lactone ring at a higher temperature can be more easily balanced.

<<(B) Use of Lubricant as Thermally Stabilizing Substance>>

Next, the use of the lubricant as the thermally stabilizing substance in the present disclosure will be described.

The lubricant content is not higher than 300 ppm based on the weight of the overall resin composition. It is important to limit the lubricant content to a very low level. If the lubricant content is higher than 300 ppm, the thermal stability of the EVOH resin composition is conversely liable to be deteriorated. The lubricant content is more preferably not higher than 250 ppm, particularly preferably not higher than 200 ppm. The lower limit of the lubricant content is typically 5 ppm, preferably 10 ppm, particularly preferably 50 ppm. If the lubricant content is excessively low, the EVOH resin composition is liable to have poorer formability.

The lubricant content is based on the weight of the EVOH resin composition that is an EVOH resin composition as a final product containing the lubricant or containing the lubricant and optional additives.

Exemplary methods for incorporating the lubricant to the EVOH resin composition include: (1) a method in which the EVOH intermediate product (pellets) having a lactone ring content ratio (Y/Z) of not less than 55 mol % with respect to the sum (Z) of the carboxylic acid content (X) and the lactone ring content (Y) in the EVOH terminal structures is prepared, and the lubricant is added directly to the EVOH intermediate product (pellets) and uniformly dry-blended with the EVOH intermediate product (pellets), whereby the lubricant is incorporated to the pellets; (2) a method in which the lubricant is dispersed in a water/methanol solution of the EVOH intermediate product to be thereby incorporated into the EVOH intermediate product; and (3) a method in which the EVOH intermediate product and the lubricant are melt-kneaded by an extruder or the like and the resulting mixture is pelletized. Of these methods, the method (1) in which the lubricant is uniformly dry-blended with the EVOH intermediate product (pellets) is particularly preferred.

Examples of the lubricant to be used in the present disclosure include: higher fatty acids such as lauric acid, myristic acid, palmitic acid, stearic acid, behenic acid, and oleic acid; metal salts of the higher fatty acids such as aluminum salts, calcium salts, zinc salts, magnesium salts, and barium salts of the higher fatty acids; esters of the higher fatty acids such as methyl esters, isopropyl esters, butyl esters, and octyl esters of the higher fatty acids; and amides of the higher fatty acids including saturated higher fatty acid amides such as stearamide and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide. Other examples of the lubricant include: low-molecular-weight polyolefins such as low-molecular-weight polyethylenes and low-molecular-weight polypropylenes each having a molecular weight of about 500 to about 10,000, and acid modification products of these low-molecular-weight polyolefins; and higher alcohols, ester oligomers, and fluorinated ethylene resins. These may be used alone or in combination. Of the above compounds for use as the lubricant, the higher fatty acids are preferred for extrusion stability and commercial availability. The higher fatty acids typically each have a carbon number of 12 to 25, preferably 12 to 23, particularly preferably 15 to 20, in a molecule thereof. Of the above compounds for use as the lubricant, the higher fatty acids typically each have a valence of 1 to 5, preferably 1 to 3, particularly preferably 1 to 2, from the viewpoint of the extrusion stability and the commercial availability. Here, the valence means the number of structures derived from a higher fatty acid in one molecule of the compound to be used as the lubricant. Where a bis-stearamide is used as the lubricant, for example, two structures each derived from a C18 higher fatty acid molecule are contained in a molecule of the bis-stearamide and, therefore, the bis-stearamide is regarded as having a higher fatty acid valence of 2. Of these, the higher fatty acids, the metal salts of the higher fatty acids, the esters of the higher fatty acids, and the amides of the higher fatty acids are preferred, and the metal salts of the higher fatty acids and the amides of the higher fatty acids are particularly preferred. Further, the amides of the higher fatty acids are more preferred for the extrusion stability.

The lubricant may be in any form, e.g., solid form (powdery form, particulate form, flake form or the like), semisolid form, liquid form, paste form, solution form, emulsion form (aqueous dispersion form) or the like. Particularly, the powdery lubricant is preferred. The powdery lubricant typically has a particle diameter of 0.1 to 100 μm, preferably 1 to 75 μm, particularly preferably 5 to 50 μm.

The lubricant content of the lubricant-containing EVOH resin composition of the present disclosure is determined, for example, by the following method.

<Determination of Lubricant Content>

Where the lubricant is added to the EVOH pellets to adhere to surfaces of the EVOH pellets, the amount of the added lubricant may be regarded as the lubricant content. Where the lubricant is contained within the EVOH resin composition and the lubricant is a higher fatty acid amide, for example, the lubricant content of the EVOH resin composition is determined by measuring the total nitrogen amount of the EVOH resin composition by means of a total trace nitrogen analyzer, and converting the total nitrogen amount into the lubricant content.

In order to significantly enhance the thermal stability improving effect of the lubricant, it is particularly preferred that the lactone ring content (Y) is not less than 0.1 mol % in the EVOH terminal structures in the present disclosure. This is supposedly because, with a higher lactone ring content, the influence of a trace amount of a decomposition product of the lubricant is relatively reduced at a higher temperature.

<<(C) Use of Boron Compound as Thermally Stabilizing Substance>>

Next, the use of the boron compound as the thermally stabilizing substance in the present disclosure will be described.

The boron compound content is not higher than 400 ppm on a boron basis based on the weight of the overall resin composition. It is important to limit the boron compound content to a very low level. If the boron compound content is higher than 400 ppm, the EVOH resin composition is conversely liable to have poorer thermal stability. The boron compound content is more preferably not higher than 300 ppm, particularly preferably not higher than 200 ppm. The lower limit of the boron compound content is typically 5 ppm, preferably 10 ppm, particularly preferably 50 ppm. If the boron compound content is excessively low, the thermal stability improving effect of the boron compound tends to be insufficient.

An exemplary method for incorporating the boron compound to the EVOH resin composition is to incorporate the boron compound to the EVOH intermediate product in the production of the EVOH resin composition from the EVOH intermediate product. More specifically, the boron compound is incorporated to the EVOH intermediate product by adding the boron compound such as boric acid or a boric acid metal salt to the chemical treatment liquid to be used in the chemical treatment step [II]. The amount of the boron compound to be incorporated to the EVOH intermediate product may be adjusted by the boron compound concentration of the chemical treatment liquid, the period and the temperature for the contact treatment of the EVOH intermediate product with the chemical treatment liquid, and the number of times of repetition of the contact treatment.

Examples of the boron compound include, in addition to boric acid, sodium borates (sodium metaborate, sodium diborate, sodium tetraborate, sodium pentaborate, sodium hexaborate, sodium octaborate, and the like), potassium borates (potassium metaborate, potassium tetraborate, potassium pentaborate, potassium hexaborate, potassium octaborate, and the like), lithium borates (lithium metaborate, lithium tetraborate, lithium pentaborate, and the like), calcium borate, barium borates (barium orthoborate, barium metaborate, barium diborate, barium tetraborate, and the like), magnesium borates (magnesium orthoborate, magnesium diborate, magnesium metaborate, trimagnesium tetraborate, pentamagnesium tetraborate, and the like), manganese borates (manganese (I) borate, manganese metaborate, manganese tetraborate, and the like), cobalt borate, zinc borates (zinc tetraborate, zinc metaborate, and the like), cadmium borates (cadmium orthoborate, cadmium tetraborate, and the like), silver borates (silver metaborate, silver tetraborate, and the like), copper borates (copper (II) borate, copper metaborate, copper tetraborate, and the like), nickel borates (nickel orthoborate, nickel diborate, nickel tetraborate, nickel octaborate, and the like), aluminum potassium borate, ammonium borates (ammonium metaborate, ammonium tetraborate, ammonium pentaborate, ammonium octaborate, and the like), lead borates (lead metaborate, lead hexaborate, and the like), bismuth borate, and boric acid salt minerals such as borax, kernite, inyoite, kotoite, suanite, and szaibelyite, among which borax and boric acid are preferred. These may be used alone or in combination.

Where the chemical treatment liquid containing the boron compound is used, the treatment temperature in the chemical treatment step [II] depends upon the boron compound content of the EVOH resin composition to be finally produced, but is typically 10° C. to 100° C., preferably 15° C. to 80° C., more preferably 20° C. to 60° C. If the treatment temperature is excessively low, it will be difficult to incorporate the predetermined amount of the acid or its salt to the EVOH intermediate product. An excessively high treatment temperature tends to result in disadvantageous production with a difficulty in handling the solution.

Where the chemical treatment liquid containing the boron compound is used, the treatment period in the chemical treatment step [II] depends upon the boron compound content of the EVOH resin composition to be finally produced, but is typically not shorter than 1 hour, preferably 1.5 hours to 48 hours, more preferably 2 to 24 hours. If the treatment period is excessively short, the EVOH intermediate product tends to suffer from uneven color or poorer thermal stability.

If the treatment period is excessively long, the EVOH intermediate product tends to be colored.

The boron content is based on the weight of the EVOH resin composition, which is an EVOH resin composition as a final product containing the boron compound or containing the boron compound and optional additives.

The most preferred method for producing the EVOH resin composition of the present disclosure is to immerse the EVOH intermediate product in the boron compound-containing liquid (e.g., the aqueous solution, the methanol solution or the like) in the EVOH intermediate product chemical treatment step [II] as described above. Other exemplary methods include: a method in which the boron compound-containing liquid is sprayed over the EVOH intermediate product containing no boron compound for the incorporation of the boron compound; and a method in which the boron compound is added to the EVOH intermediate product containing no boron compound and the resulting mixture is melted in an extruder. These methods may be used in combination to control the boron compound content of the finally provided EVOH resin composition within an intended range.

The boron-containing EVOH resin composition may be produced by incorporating the boron compound to an EVOH material or an EVOH resin composition before the preparation of the EVOH intermediate product (pellets). Where the incorporation of the boron compound precedes the preparation of the EVOH intermediate product (pellets), however, it is not easy to control the boron compound content of the finally provided EVOH resin composition to not higher than 400 ppm. Therefore, the method in which the EVOH intermediate product (pellets) is first prepared and then the boron compound is incorporated to the EVOH intermediate product as described above is generally employed.

The boron compound content of the EVOH resin composition of the present disclosure may be determined, for example, in the following manner.

<Determination of Boron Compound Content>

The EVOH resin composition is decomposed together with concentrated nitric acid by a microwave decomposition method. Then, the resulting solution is diluted with purified water to a predetermined volume to prepare a sample solution, and the boron amount of the boron compound contained in the sample solution is measured by means of an inductively coupled plasma emission spectrometer (ICP-AES).

<<(D) Use of Conjugated Polyene Compound as Thermally Stabilizing Substance>>

Next, the use of the conjugated polyene compound as the thermally stabilizing substance in the present disclosure will be described.

The conjugated polyene compound content is not higher than 800 ppm based on the weight of the overall resin composition. Where the conjugated polyene compound content is very low, radicals generated during heating at a higher temperature are effectively trapped. If the conjugated polyene compound content is higher than 800 ppm, however, the gel-like objects occurring due to the long-term stagnation product are liable to be significantly colored, resulting in quality reduction due to the coloration. Therefore, the conjugated polyene compound content is more preferably not higher than 700 ppm, particularly preferably not higher than 500 ppm. The lower limit of the conjugated polyene compound content is typically 5 ppm, preferably 50 ppm, particularly preferably 150 ppm for excellent post-heating coloration suppressing effect.

The conjugated polyene compound content is based on the weight of the EVOH resin composition, which is an EVOH resin composition as a final product containing the conjugated polyene compound or containing the conjugated polyene compound and optional additives.

Exemplary methods for producing the EVOH resin composition containing the predetermined amount of the conjugated polyene compound include: (1) a method in which powder of the conjugated polyene compound is added directly to the EVOH intermediate product (pellets) having a lactone ring content ratio (Y/Z) of not less than 55 mol % with respect to the sum (Z) of the carboxylic acid content (X) and the lactone ring content (Y) in the EVOH terminal structures, and mixed with the EVOH intermediate product by shaking; (2) a method in which the conjugated polyene compound is added as a polymerization inhibitor to the unsaponified ethylene-vinyl ester copolymer after the polymerization reaction; (3) a method in which the EVOH intermediate product (pellets) is immersed in a solution (e.g., an aqueous solution, a methanol solution or the like) containing the conjugated polyene compound to infiltrate the conjugated polyene compound into the EVOH intermediate product; and (4) a method in which the conjugated polyene compound is added to the EVOH intermediate product (pellets) and the resulting mixture is melted in an extruder or the like. Of these, the method (2) in which the conjugated polyene compound is added as the polymerization inhibitor to the unsaponified ethylene-vinyl ester copolymer after the polymerization reaction is preferred.

The conjugated polyene compound to be used in the present disclosure is a compound containing so-called conjugated double bonds, i.e., having a structure such that carbon-carbon double bonds and carbon-carbon single bonds are alternately connected to each other and the number of the carbon-carbon double bonds is two or more. The conjugated polyene compound may be a conjugated diene compound having a structure such that two carbon-carbon double bonds and one carbon-carbon single bond are alternately connected to each other, a conjugated triene compound having a structure such that three carbon-carbon double bonds and two carbon-carbon single bonds are alternately connected to each other, or a conjugated polyene compound having a structure such that more than three carbon-carbon double bonds and more than two carbon-carbon single bonds are alternately connected to each other.

However, a conjugated polyene compound having eight or more conjugated carbon-carbon double bonds is colored, so that a product formed from an EVOH resin composition containing such a conjugated polyene compound is liable to be colored. Therefore, a conjugated polyene compound having seven or less conjugated carbon-carbon double bonds is preferred. The conjugated polyene compound may have a structure such that plural sets of conjugated double bonds each including two or more carbon-carbon double bonds are present in an unconjugated state in its molecule. Tung oil containing three conjugated trienes in its molecule is also an example of the conjugated polyene compound.

Examples of the conjugated polyene compound include: conjugated diene compounds, such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid compounds (sorbic acid, sorbic acid esters, sorbic acid salts, and the like), ascorbic acid compounds (ascorbic acid, ascorbic acid esters, ascorbic acid metal salts, and the like), and abietic acid, each having a conjugated structure containing two carbon-carbon double bonds; conjugated triene compounds, such as 1,3,5-hexatriene, 2,4,6-octatriene-1-carboxylic acid, eleostearic acid, tung oil, and cholecalciferol, each having a conjugated structure containing three carbon-carbon double bonds; conjugated polyene compounds, such as cyclooctatetraene, 2,4,6,8-decatetraene-1-carboxylic acid, retinol, and retinoic acid, each having a conjugated structure containing four or more carbon-carbon double bonds; and terpene compounds. Of these, 1,3-pentadiene, myrcene, and farnesene each have a plurality of stereoisomers, which are all usable. Two or more of these conjugated polyene compounds may be used in combination.

Of these conjugated polyene compounds, the conjugated polyene compounds having a carboxyl group are preferred because of their higher water affinity, and the cyclic conjugated polyene compounds having a carboxyl group are more preferred. Particularly, the sorbic acid compounds are preferred, and sorbic acid is particularly preferred.

The conjugated polyene compound typically has a molecular weight of 30 to 500, preferably 50 to 400, particularly preferably 100 to 300, for productivity and handling ease. The conjugated polyene compound typically has 4 to 30 carbon atoms, preferably 4 to 20 carbon atoms, particularly preferably 4 to 10 carbon atoms, in its molecule for productivity and handling ease.

The conjugated polyene compound content of the EVOH resin composition is determined, for example, by extracting the conjugated polyene compound from the EVOH resin composition with the use of a solvent, measuring the amount of the conjugated polyene compound contained in the resulting extraction solvent by liquid chromatography, and converting the conjugated polyene compound amount to the conjugated polyene compound content.

In order to significantly enhance the thermal stability improving effect of the conjugated polyene compound, it is particularly preferred that the lactone ring content ratio (Y/Z) with respect to the sum (Z) of the carboxylic acid content (X) and the lactone ring content (Y) in the EVOH terminal structures is not less than 62 mol % in the present disclosure. This is supposedly because, with a higher lactone ring content ratio, the conjugated polyene structure of the conjugated polyene compound provides the radical trapping effect on the decomposition reaction of the lactone ring at a higher temperature. Thus, it is considered that even a very low conjugated polyene compound content is significantly contributable to the thermal stability.

The cinnamic acid component, the lubricant, the boron compound, and the conjugated polyene compound may be used alone or in combination as the thermally stabilizing substance for the EVOH resin composition of the present disclosure.

As long as the object of the present disclosure is not impaired, the EVOH resin composition of the present disclosure may contain inorganic salt (e.g., hydrotalcites or the like), plasticizer (e.g., aliphatic polyhydric alcohol such as ethylene glycol, glycerin or hexanediol), oxygen absorber [e.g., inorganic oxygen absorber such as reduced iron powder, reduced iron powder containing a water-absorbing substance, an electrolyte or the like, aluminum powder, potassium sulfite or photo-catalytic titanium oxide; organic compound oxygen absorber such as polyvalent phenol compound (e.g., hydroquinone, gallic acid, hydroxyl-containing phenol aldehyde resin or the like), coordination compound obtained by coordination-bonding a nitrogen-containing compound and a transition metal (e.g., bis-salicylaldehyde-imine cobalt, tetraethylenepentamine cobalt, cobalt-Schiff base complex, porphyrins, macrocyclic polyamine complex, polyethyleneimine-cobalt complex or the like), reaction product obtained by reaction between an amino acid and a hydroxyl-containing reductive substance, or triphenylmethyl compound; or polymer oxygen absorber such as coordination compound obtained by coordination-bonding a nitrogen-containing resin and a transition metal (e.g., combination of MXD nylon and cobalt), blend of a tertiary hydrogen-containing resin and a transition metal (e.g., combination of polypropylene and cobalt), blend of an unsaturated carbon-carbon bond-containing resin and a transition metal (e.g., combination of polybutadiene and cobalt), photo-oxidation degradative resin (e.g., polyketone), anthraquinone polymer (e.g., polyvinylanthraquinone), or mixture containing any of these blends and a photo initiator (benzophenone or the like), peroxide scavenger (commercially available antioxidant or the like) or deodorant (active carbon or the like)], thermal stabilizer, photo stabilizer, UV absorber, colorant, antistatic agent, surfactant (excluding lubricant), antibacterial agent, antiblocking agent, slipping agent, filler (e.g., inorganic filler or the like), and/or some other resin (e.g., polyolefin, polyamide or the like). These compounds may be used alone or in combination.

The EVOH resin composition of the present disclosure may be prepared in various forms, e.g., in a pellet form, in a powdery form or in a liquid form, for use as a forming material for various products. The EVOH resin composition of the present disclosure is preferably prepared as pellets for melt forming to more advantageously provide the effect of the present disclosure.

The EVOH resin composition of the present disclosure may be mixed with a resin other than the EVOH to be used for the EVOH resin composition of the present disclosure, and the resulting resin composition also falls within the category of the EVOH resin composition of the present disclosure. Exemplary products to be formed from the EVOH resin composition of the present disclosure for practical applications include a single-layer film formed by using the EVOH resin composition of the present disclosure, and a multilayer structure including at least one layer formed by using the EVOH resin composition of the present disclosure.

The multilayer structure will hereinafter be described.

For production of the multilayer structure of the present disclosure, the layer formed by using the EVOH resin composition of the present disclosure is laminated with some other base material (a thermoplastic resin or the like) on one or both sides thereof. Exemplary laminating methods include: a laminating method in which the other base material is melt-extruded onto a film or a sheet formed by using the EVOH resin composition of the present disclosure; a laminating method in which the EVOH resin composition of the present disclosure or the like is melt-extruded onto the other base material; a method in which the EVOH resin composition of the present disclosure and the other base material are coextruded; and a method in which a film or a sheet (layer) formed by using the EVOH resin composition of the present disclosure and the other base material (layer) are dry-laminated together with the use of a known adhesive agent such as of organic titanium compound, isocyanate compound, polyester compound or polyurethane compound. The melt forming temperature for the melt extrusion is generally selected from a range of 150° C. to 300° C.

Specific examples of the other base material include: olefin homopolymers and copolymers including polyethylenes such as linear low-density polyethylenes, low-density polyethylenes, very-low-density polyethylenes, medium-density polyethylenes, and high-density polyethylenes, ethylene-vinyl acetate copolymers, ionomers, ethylene-propylene (block or random) copolymers, ethylene-acrylic acid copolymers, ethylene-acrylate copolymers, polypropylenes, propylene-α-olefin (C4 to C20 α-olefin) copolymers, polybutenes, and polypentenes, and polyolefin resins in a broader sense such as obtained by graft-modifying any of these olefin homopolymers and copolymers with an unsaturated carboxylic acid or an unsaturated carboxylic acid ester; and polyester resins, polyamide resins (including polyamide copolymers), polyvinyl chlorides, polyvinylidene chlorides, acryl resins, polystyrene resins, vinyl ester resins, polyester elastomers, polyurethane elastomers, chlorinated polyethylenes, chlorinated polypropylenes, aromatic and aliphatic polyketones, polyalcohols obtained by reduction of these polymers, and EVOHs other than the EVOH to be used in the present disclosure. From the viewpoint of the practicality and the physical properties (particularly, the strength) of the multilayer structure, the polyolefin resins, the polyamide resins, the polystyrene resins, and the polyester resins are preferred. Further, the polypropylenes, the ethylene-propylene (block or random) copolymers, the polyamide resins, the polyethylenes, the ethylene-vinyl acetate copolymers, the polystyrenes, polyethylene terephthalates (PET), and polyethylene naphthalates (PEN) are preferably used.

Where a product, such as a film or a sheet, formed by using the EVOH resin composition of the present disclosure is extrusion-coated with the other base material, or where the film or the sheet formed by using the EVOH resin composition of the present disclosure and a film, a sheet or the like of the other base material are laminated together with the use of the adhesive agent, usable examples of the base material other than the thermoplastic resins described above include paper, metal foil, uniaxially or biaxially stretched plastic film or sheet, film or sheet on which an inorganic compound is vapor-deposited, woven fabric, nonwoven fabric, metal fiber material and wood material.

Where layers a (a1, a2, . . . ) formed by using the EVOH resin composition of the present disclosure and layers b (b1, b2, . . . ) of the other base material (e.g., the thermoplastic resin) are laminated together to produce a multilayer structure having an innermost layer a, the layered configuration of the multilayer structure of the present disclosure is not limited to a double layer structure a/b (which means an inner layer/outer layer structure, and this definition also applies to the following description), but may be any combination of these layers, e.g., a/b/a, a1/a2/b, a/b1/b2, a1/b1/a2/b2, a1/b1/b2/a2/b2/b1, or the like. Where the multilayer structure further includes a regrind layer R formed of a mixture containing at least the EVOH resin composition of the present disclosure and the thermoplastic resin, the layered configuration of the multilayer structure may be, for example, a/R/b, a/R/a/b, a/b/R/a/R/b, a/b/a/R/a/b, a/b/R/a/R/a/R/b, or the like.

In the aforementioned layered configuration, as required, an adhesive resin layer may be provided between layers. Various adhesive resins are usable as an adhesive resin for the adhesive resin layer. Examples of the adhesive resin for providing a highly stretchable multilayer structure include olefin polymers modified as containing a carboxyl group by chemically bonding an unsaturated carboxylic acid or its anhydride to the olefin polymers (the aforementioned polyolefin resins in a broader sense) by an addition reaction, a graft reaction or the like.

Specific preferred examples of the modified olefin polymers containing the hydroxyl group include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, and ethylene-vinyl acetate copolymers graft-modified with maleic anhydride, which may be used alone or in combination as a mixture. In this case, the proportion of the unsaturated carboxylic acid or its anhydride to be contained in such a modified olefin polymer is preferably 0.001 to 3 wt. %, more preferably 0.01 to 1 wt. %, particularly preferably 0.03 to 0.5 wt. %. If the modification degree of such a modification product is excessively low, the adhesiveness tends to be poorer. If the modification degree is excessively high, on the other hand, a crosslinking reaction tends to occur, thereby reducing the formability.

Further, the adhesive resin may be blended with the EVOH of the EVOH resin composition of the present disclosure, the other EVOH, a rubber/elastomer component such as polyisobutylene or ethylene propylene rubber, or the resin for the layer b. Particularly, the adhesiveness can be advantageously improved by blending a polyolefin resin different from the base polyolefin resin for the adhesive resin.

The thicknesses of the respective layers of the multilayer structure cannot be unconditionally specified, but depend upon the layered configuration, the type of the layer b, the use purpose, the shape of the formed product, and the required physical properties. The thickness of the layer a is typically selected from a range of 5 to 500 μm, preferably 10 to 200 μm, and the thickness of the layer b is typically selected from a range of 10 to 5,000 μm, preferably 30 to 1,000 μm. The thickness of the adhesive resin layer is typically selected from a range of 5 to 400 μm, preferably about 10 to about 150 pin.

The multilayer structure may be used as it is in various forms. It is preferred to perform a heat stretching process on the multilayer structure for improvement of the physical properties of the multilayer structure. The term "heat stretching process" herein means a process in which a thermally uniformly heated laminate in the form of a film, a sheet or a parison is uniformly formed into a cup, a tray, a tube or a film with the use of a chuck, a plug, a vacuum force, a compressed air force, blowing means, or other forming means. The stretching process may be a uniaxial stretching process or a biaxial stretching process. The stretching ratio of the laminate is preferably as high as possible for physical properties. This makes it possible to produce stretched formed products excellent in gas barrier property without pinholes, cracking, uneven stretching, uneven thickness, delamination (interlayer separation), and the like which may otherwise occur during the stretching.

Other exemplary methods for stretching the multilayer structure include roll stretching method, tenter stretching method, tubular stretching method, stretch-blowing method, and vacuum pressure forming method each having a higher stretching ratio. A simultaneous biaxial stretching method or a sequential biaxial stretching method may be employed for the biaxial stretching process. The stretching temperature is selected from a range of 60° C. to 170° C., preferably about 80° C. to about 160° C. It is also preferred to perform a heat-setting process after the completion of the stretching process. The heat-setting process may be performed by known means. The heat-setting may be achieved by heat-treating the stretched film at 80° C. to 170° C., preferably 100° C. to 160° C., for about 2 to about 600 seconds while keeping the stretched film in tension.

Where the multilayer structure is used for heat-shrink packaging applications for raw meat, processed meat, cheese or the like, the multilayer structure not subjected to the heat-setting process after the stretching is used as a product film, and the raw meat, the processed meat, the cheese or the like is wrapped with the film, which is in turn heat-treated at 50° C. to 130° C., preferably 70° C. to 120° C., for about 2 to about 300 seconds to be thereby heat-shrunk for tight packaging.

The multilayer structure thus produced may be used in any desired form. Exemplary forms include film, sheet, tape, and profile extrusion product. As required, the multilayer structure may be subjected to heat treatment, cooling process, rolling process, printing process, dry laminating process, solution or melt coating process, bag making process, deep drawing process, box making process, tube making process, splitting process, or the like.

Cups, trays, tubes, and other containers produced from the multilayer structure, and bags and caps produced from the stretched film formed from the multilayer structure are useful as packaging materials for packaging foods, beverages, pharmaceutical products, cosmetics, industrial chemicals, detergents, agricultural chemicals, fuels, and the like.

EXAMPLES

Embodiments of the present disclosure will hereinafter be described more specifically by way of examples thereof employing different thermally stabilizing substances. However, it should be understood that the embodiments of the present disclosure be not limited to these examples within the scope of the present disclosure.

In the following examples, "parts" "%" and "ppm" are based on weight, and "mol %" is based on mol.

Physical properties and quantities were determined in the following manner.

(1) Quantitative Analysis of EVOH Terminal Structures (NMR Method)
  <Measurement Conditions>
  Apparatus: Bruker's AVANCE III
  Measurement frequency: 400 MHz
  Solvent: Heavy water/ethanol-D6 (having a heavy water/ethanol weight ratio of 35/65), and DMSO-D6
  Polymer concentration: 5%
  Measurement temperatures: 70° C. for heavy water/ethanol-D6, and 50° C. for DMSO-D6
  Integration number: 16
  Pulse recurrence time: 4 seconds
  Sample rotation speed: 20 Hz
  Additive: Trifluoroacetic acid
  <Analysis Method>
(1-1) Measurement of Terminal Methyl Amount The terminal methyl amount was calculated based on $^1$H-NMR measurement (measurement with DMSO-D6 at 50° C.) (with a chemical shift determined with respect to a peak appearing at 2.50 ppm for DMSO). The terminal methyl amount was calculated from the following expression (Ex. 1) by using an integration value ($I_{Me-1}$) for terminal methyl between 0.7 and 0.95 ppm, an integration value ($I_{CH2}$) for non-terminal methylene between 0.95 and 1.85 ppm (a total integration value for methylene in the ethylene unit, the vinyl alcohol unit, and the vinyl acetate unit), an integration value ($I_{OAc}$) for terminal methyl in the vinyl acetate unit between 1.9 and 2 ppm, and an integration value ($I_{CH}$) for methine in the vinyl alcohol unit between 3.1 and 4.3 ppm as shown in a chart of FIG. 1. Here, the integration values ($I_{Me-1}$), ($I_{CH2}$), ($I_{OAc}$), and ($I_{CH}$) were integration values of peaks attributable to the terminal methyl, the non-terminal methylene, the terminal methyl in the vinyl acetate unit, and the methine in the vinyl alcohol unit, respectively.

$$\text{Terminal methyl amount(mol \%)}=(I_{Me-1}/3)/[(I_{Me-1}/3)+(I_{OAc}/3)+I_{CH}+\{I_{CH2}-2\times I_{CH2}-2\times (I_{OAc}/3)-2\times (I_{Me-1}/3)\}/4] \quad (\text{Ex. 1})$$

(1-2) Measurement of Carboxylic Acid Content (X) and Lactone Ring Content (Y)

The amounts of the carboxylic acid group and the lactone ring present in polymer terminals were calculated based on $^1$H-NMR measurement (measurement with a heavy water/ethanol-D6 solvent at 70° C.) (with a chemical shift determined with respect to a peak appearing at 0 ppm for TMS) by using the terminal methyl amount (mol %) obtained in the item (1-1).

Figure 2:
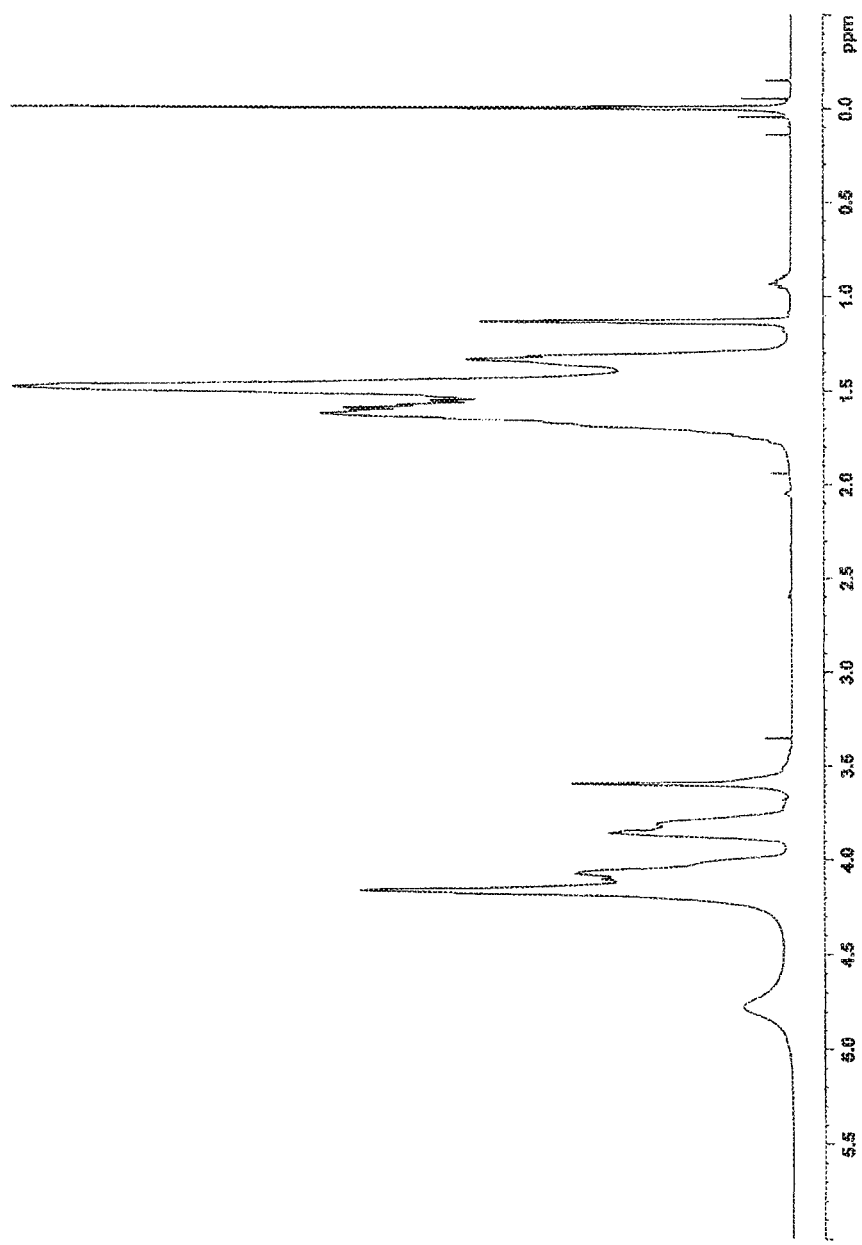
FIG. 2 is a typical $^1$H-NMR chart of the EVOH in a heavy water/ethanol-D6 solvent.

More specifically, the carboxylic acid content (X) (mol %) and the lactone ring content (Y) (mol %) were calculated from the following expressions (Ex. 2) and (Ex. 3), respectively, by using an integration value ($I_{Me-2}$) of a peak appearing between 0.7 and 1 ppm for terminal methyl, an integration value ($I_x$) of a peak appearing between 2.15 and 2.32 ppm and an integration value ($I_y$) of a peak appearing between 2.5 and 2.7 ppm as shown in a chart of FIG. 2. Here, the integration values ($I_{Me-2}$), ($I_x$), and ($I_y$) were integration values of peaks attributable to the terminal methyl, the carboxylic acid group, and the terminal lactone ring, respectively.

$$\text{Carboxylic acid content}(X)(\text{mol \%})=\text{Terminal methyl amount(mol \%)}\times (I_x/2)/(I_{Me-2}/3) \quad (\text{Ex. 2})$$

$$\text{Lactone ring content}(Y)(\text{mol \%})=\text{Terminal methyl amount(mol \%)}\times (I_y/2)/(I_{Me-2}/3) \quad (\text{Ex. 3})$$

(1-3) Calculation of Lactone Ring Content Ratio (Y/Z) with respect to Sum (Z) of Carboxylic Acid Content (X) and Lactone Ring Content (Y) in Terminal Structures The lactone ring content ratio (Y/Z) was calculated from the following expression (Ex. 4) based on the carboxylic acid content (X) and the lactone ring content (Y) calculated above.

If the calculations are impossible due to the presence of additives, impurities and the like other than the EVOH, a sample cleaning process or the like may be performed. The sample cleaning process is performed, for example, by the following method. More specifically, a sample is freeze-crushed, and the crushed sample is immersed in water to be ultrasonically cleaned. Then, the resulting sample is filtered, and the filtration residue is dried. The NMR measurement is performed on the dried filtration residue.

$$\text{Lactone ring content ratio}(Y/Z)(\text{mol \%}) \text{ with respect to sum}(Z) \text{ of carboxylic acid content}(X) \text{ and lactone ring content}(Y)=\{Y/(X+Y)\}\times 100 \quad (\text{Ex. 4})$$

(2) Cinnamic Acid Content (ppm) (Liquid Chromatography Mass Spectrometry (LC/MS/MS))
  [Preparation of Standard Solutions]
  Cinnamic acid (10.89 mg) was weighed in a 10-mL measuring flask, and dissolved in methanol to provide a 10-mL solution (standard stock solution having a concentration of 1,089 μg/mL). Then, the standard stock solution thus prepared was diluted with methanol to provide mixed standard solutions respectively having concentrations of 0.109 µg/mL, 0.218 µg/mL, 0.545 µg/mL, 1.09 g/mL, and 2.18 µg/mL. A calibration line was prepared by performing the LC/MS/MS analysis on these mixed standard solutions.

[Preparation of Sample Solution]
(1) After pellets (1 g) of the EVOH resin composition of the present disclosure were weighed in a 10-mL measuring flask, 9 mL of methanol was added to the flask.
(2) The resulting solution was ultrasonically treated for 120 minutes, and cooled to a room temperature (25° C.).
(3) Methanol was added to this solution to a volume of 10 mL (sample solution (I)).
(4) Then, 1 mL of the sample solution (I) was put in a 10-mL measuring flask, and diluted with methanol to a volume of 10 mL (sample solution (II)).
(5) The sample solution (I) or the sample solution (II) was filtered by a PTFE filter (0.45 pin), and the resulting liquid was used as a measurement solution for the LC/MS/MS analysis.

The detection concentration of cinnamic acid was calculated based on a peak area value detected by the LC/MS/MS analysis and the calibration line prepared by using the standard solutions.

[LC/MS/MS Measurement Conditions]
LC system: LC-20A (available from Shimadzu Corporation)
Mass spectrometer: API4000 (AB/MDS Sciex)
Analysis column: Scherzo SM-C18 (3.0×75 mm, 3 µm)
Column temperature: 45° C.
Mobile phase: A. 10 mmol/L ammonium acetate aqueous solution
    B. Methanol
Time program: 0.0 to 5.0 minutes B (%)=30% to 95%
    5.0 to 10.0 minutes B (%)=95%
    10.1 to 15.0 minutes B (%)=30%
Flow rate: 0.4 mL/minute
Switch valve: 2.0 to 6.0 minutes to MS
Injection amount: 5 µL
Ionization: ESI method
Detection: Negative ion detection (SRM method)
Ion monitoring: Q1=147.0 to Q3=102.9 (CE: −15 eV)

(3) Lubricant Content (ppm)
The amount of the added lubricant was regarded as the lubricant content.

(4) Boron Compound Content (ppm)
The EVOH resin composition was decomposed together with concentrated nitric acid by a microwave decomposition method. Then, the resulting solution was diluted with purified water to a predetermined volume to prepare a sample solution, and the boron amount of the boron compound contained in the sample solution was measured by means of an inductively coupled plasma emission spectrometer (ICP-AES).

(5) Sorbic Acid Content (Conjugated Polyene Content) (ppm) (Liquid Chromatography Mass Spectrometry)
First, 8 mL of an extraction solvent having a methanol/water volume ratio of methanol/water=1/1 was added to 1 g of the EVOH resin composition. The resulting solution was ultrasonically treated still at a temperature of 20° C. for 1 hour, whereby sorbic acid was extracted from the resin. The resulting solution was cooled, and then diluted with the extraction solvent to a volume of 10 mL. The resulting solution was filtered, and then analyzed by a liquid chromatograph/UV spectrophotometer, whereby the amount of sorbic acid contained in the solution was determined. The sorbic acid amount was converted into the sorbic acid content of the EVOH resin composition.

[HPLC Measurement Conditions]
LC system: AGILENT 1260/1290 (available from Agilent Technologies, Inc.)
Detector: AGILENT 1260 infinity diode array detector (available from Agilent Technologies, Inc.)
Column: CADENZA CD-C18 (100×3.0 mm, 3 µm) (available from Imtakt Corporation)
Column Temperature: 40° C.
Mobile phase A: Aqueous solution containing 0.05% formic acid and 5 vol. % acetonitrile
Mobile phase B: Aqueous solution containing 0.05% formic acid and 95 vol. % acetonitrile
Time program: 0.0 to 5.0 minutes B (%)=30%
    5.0 to 8.0 minutes B (%)=30% to 50%
    8.0 to 10.0 minutes B (%)=50%
    10.0 to 13.0 minutes B (%)=50% to 30%
    13.0 to 15.0 minutes B (%)=30%
Flow rate: 0.2 mL/minute
UV detection wavelength: 190 to 400 nm
Quantitative wavelength: 262 nm (6) Evaluation for Thermal Stability
The thermal stability was measured by using 5 mg of the EVOH resin composition by means of a thermogravimetric analyzer (PYRIS 1 TGA available from Perkin Elmer Corporation). The EVOH resin composition was evaluated for the thermal stability based on a temperature at which the weight of the EVOH resin composition was reduced to 95% of the original weight. The measurement was performed at a temperature elevation rate of 10° C./minute within a temperature range of 30° C. to 550° C. at a gas flow rate of 20 mL/minute in a nitrogen atmosphere by the TGA.

(7) Evaluation for Post-Heating Coloration Degree
The EVOH resin composition was evaluated for post-heating coloration degree by means of a visual analyzer (IRIS available from Alfa M.O.S. Japan K.K.). The evaluation was based on the percentage (%) of an area thermally colored to a typical color (R232, G216, B168) when the EVOH resin composition was heated at 240° C. for 10 minutes.

<<(A) Use of Cinnamic Acid Component as Thermally Stabilizing Substance>>

Example 1

A water/methanol mixed solution (having a water/methanol weight ratio of 35/65 and an EVOH resin concentration of 40%) of an ethylene-vinyl alcohol copolymer having an ethylene content of 32 mol %, a saponification degree of 99.5 mol %, and an MFR of 12 g/10 minutes (measured at 210° C. with a load of 2160 g)) was prepared as a solution of an EVOH intermediate product, which was in turn extruded into a strand form in a water bath containing cold water. The resulting strands were solidified, and then cut by a cutter, whereby cylindrical pellets of the EVOH intermediate product (having a water content of 100 parts based on 100 parts of the EVOH intermediate product) were produced.

Subsequently, the EVOH intermediate product pellets were fed into an aqueous solution containing 350 ppm of acetic acid, 370 ppm of sodium acetate, 15 ppm of calcium dihydrogenphosphate, and 57 ppm of boric acid, and stirred at 30° C. to 35° C. for 1 hour. Then, this stirring process was performed five times by changing the aqueous solution (first-stage chemical treatment step). The weight-based concentration ratio of the carboxylic acid concentration to the metal ion concentration of the carboxylic acid metal salt in the aqueous solution used in the first-stage chemical treatment step (carboxylic acid concentration/metal ion concentration) was 3.0.

Then, the resulting EVOH intermediate product pellets were fed into an aqueous solution containing 700 ppm of acetic acid, 370 ppm of sodium acetate, 15 ppm of calcium dihydrogenphosphate, and 57 ppm of boric acid, and stirred at 30° C. to 35° C. for 4 hours, whereby the acetic acid content of the EVOH intermediate product pellets was adjusted (second-stage chemical treatment step). The weight-based concentration ratio of the carboxylic acid concentration to the metal ion concentration of the carboxylic acid metal salt in the aqueous solution used in the second-stage chemical treatment step (carboxylic acid concentration/metal ion concentration) was 6.7. The resulting EVOH intermediate product pellets were dried at 121° C. for 10 hours.

Subsequently, an ethanol solution containing 0.125% cinnamic acid was sprayed over the dried EVOH intermediate product pellets (each having a diameter of 2.3 mm and a length of 2.4 mm) so that the resulting pellets had a cinnamic acid content of 200 ppm on a weight basis. Thus, an EVOH resin composition of the present disclosure was produced. The measurement results for the EVOH resin composition thus produced are shown below in Table 1.

Example 2

An EVOH resin composition was produced in substantially the same manner as in Example 1, except that the drying temperature in the EVOH intermediate product pellet drying step was changed from 121° C. to 150° C. The measurement results for the EVOH resin composition thus produced are shown below in Table 1.

Example 3

An EVOH resin composition was produced in substantially the same manner as in Example 1, except that the amount of acetic acid contained in the aqueous solution used in the second-stage chemical treatment step was changed to 3,500 ppm and the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7. The measurement results for the EVOH resin composition thus produced are shown below in Table 1.

Example 4

An EVOH resin composition was produced in substantially the same manner as in Example 1, except that the amount of acetic acid contained in the aqueous solution used in the second-stage chemical treatment step was changed to 3,500 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7, and that the drying temperature in the drying step was changed from 121° C. to 150° C. The measurement results for the EVOH resin composition thus produced are shown below in Table 1.

Comparative Example 1

An EVOH resin composition was produced in substantially the same manner as in Example 1, except that the amount of acetic acid contained in the aqueous solution used in the second-stage chemical treatment step was changed to 350 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 3.4, and that the drying temperature in the drying step was changed from 121° C. to 118° C. The measurement results for the EVOH resin composition thus produced are shown below in Table 1.

Comparative Example 2

An EVOH resin composition was produced in substantially the same manner as in Example 1, except that the cinnamic acid content was changed from 200 ppm to 600 ppm on a weight basis. The measurement results for the EVOH resin composition thus produced are shown below in Table 1.

TABLE 1

|  | Example 1 | Example 2 | Example 3 | Example 4 | Comparative Example 1 | Comparative Example 2 |
| --- | --- | --- | --- | --- | --- | --- |
| Carboxylic acid content (X) (mol %) | 0.08 | 0.08 | 0.08 | 0.09 | 0.11 | 0.08 |
| Lactone ring content (Y) (mol %) | 0.13 | 0.12 | 0.14 | 0.14 | 0.12 | 0.13 |
| Lactone ring content ratio (Y/Z) (mol %) | 62 | 61 | 64 | 62 | 52 | 62 |
| Cinnamic acid content (ppm) | 200 | 200 | 200 | 200 | 200 | 600 |
| Thermal stability (° C.) | 364 | 363 | 370 | 363 | 340 | 353 |

The above results indicate that Examples, which satisfy the requirements of the present disclosure for the lactone ring content ratio (Y/Z) with respect to the sum (Z) of the carboxylic acid content (X) and the lactone ring content (Y) in the EVOH terminal structures and for the cinnamic acid content, are excellent in high-temperature thermal stability. On the other hand, Comparative Example 1, which does not satisfy the requirement for the lactone ring content ratio (Y/Z) and Comparative Example 2, which does not satisfy the requirement for the cinnamic acid content, are both poorer in thermal stability. In the evaluation for the thermal stability, the thermal stability temperature is 363° C. to 370° C. in Examples 1 to 4, 340° C. in Comparative Example 1, and 353° C. in Comparative Example 2. Differences in thermal stability temperature between Examples and Comparative Examples are about 10° C. to about 30° C. The differences not less than 10° C. at higher temperatures are significant from the viewpoint of reaction kinetics, because the oxidative degradation and the thermal decomposition of the resin occur due to chemical reactions and, in general, the reaction rates of the chemical reactions are exponentially increased with the temperature increase.

<<(B) Use of Lubricant as Thermally Stabilizing Substance>>

Example 5

A water/methanol mixed solution (having a water/methanol weight ratio of 35/65 and an EVOH resin concentration of 40%) of an ethylene-vinyl alcohol copolymer intermediate product having an ethylene content of 32 mol %, a saponification degree of 99.5 mol %, and an MFR of 12 g/10 minutes (measured at 210° C. with a load of 2160 g) was prepared. Then, the EVOH intermediate product solution was extruded into a strand form in a water bath containing cold water. The resulting strands were solidified, and then cut by a cutter, whereby cylindrical EVOH intermediate product pellets (having a water content of 100 parts based on 100 parts of the EVOH intermediate product) were produced.

Subsequently, the EVOH intermediate product pellets were fed into an aqueous solution containing 350 ppm of acetic acid, 370 ppm of sodium acetate, 15 ppm of calcium dihydrogenphosphate, and 57 ppm of boric acid, and stirred at 30° C. to 35° C. for 1 hour. Then, this stirring process was performed five times by changing the aqueous solution (first-stage chemical treatment step). The weight-based concentration ratio of the carboxylic acid concentration to the metal ion concentration of the carboxylic acid metal salt in the aqueous solution used in the first-stage chemical treatment step (carboxylic acid concentration/metal ion concentration) was 3.0.

Then, the resulting EVOH intermediate product pellets were fed into an aqueous solution containing 2,450 ppm of acetic acid, 370 ppm of sodium acetate, 15 ppm of calcium dihydrogenphosphate, and 57 ppm of boric acid, and stirred at 30° C. to 35° C. for 4 hours, whereby the acetic acid content of the EVOH intermediate product pellets was adjusted (second-stage chemical treatment step). The weight-based concentration ratio of the carboxylic acid concentration to the metal ion concentration of the carboxylic acid metal salt in the aqueous solution used in the second-stage chemical treatment step (carboxylic acid concentration/metal ion concentration) was 23.6.

After the resulting EVOH intermediate product pellets were dried at 121° C. for 10 hours, a lubricant (ethylene bisstearamide) was uniformly dry-blended with the dried EVOH intermediate product pellets (each having a diameter of 2.3 mm and a length of 2.4 mm) so that the EVOH intermediate product pellets had a lubricant content of 100 ppm on a weight basis. Thus, a lubricant-containing EVOH resin composition of the present disclosure was produced. The measurement results for the EVOH resin composition thus produced are shown below in Table 2.

Example 6

An EVOH resin composition was produced in substantially the same manner as in Example 5, except that the drying temperature in the EVOH intermediate product pellet drying step was changed from 121° C. to 150° C. The measurement results for the EVOH resin composition thus produced are shown below in Table 2.

Example 7

An EVOH resin composition was produced in substantially the same manner as in Example 5, except that the amount of acetic acid contained in the aqueous solution used in the second-stage chemical treatment step was changed to 3,500 ppm and the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7. The measurement results for the EVOH resin composition thus produced are shown below in Table 2.

Example 8

An EVOH resin composition was produced in substantially the same manner as in Example 5, except that the amount of acetic acid contained in the aqueous solution used in the second-stage chemical treatment step was changed to 3,500 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7, and that the drying temperature in the drying step was changed from 121° C. to 150° C. The measurement results for the EVOH resin composition thus produced are shown below in Table 2.

Comparative Example 3

An EVOH resin composition was produced in substantially the same manner as in Example 5, except that the amount of acetic acid contained in the aqueous solution used in the second-stage chemical treatment step was changed to 350 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 3.4, and that the drying temperature in the drying step was changed from 121° C. to 118° C. The measurement results for the EVOH resin composition thus produced are shown below in Table 2.

Comparative Example 4

An EVOH resin composition was produced in substantially the same manner as in Example 6, except that the lubricant content was changed from 100 ppm to 400 ppm on a weight basis. The measurement results for the EVOH resin composition thus produced are shown below in Table 2.

TABLE 2

|  | Example 5 | Example 6 | Example 7 | Example 8 | Comparative Example 3 | Comparative Example 4 |
| --- | --- | --- | --- | --- | --- | --- |
| Carboxylic acid content (X) (mol %) | 0.08 | 0.08 | 0.08 | 0.09 | 0.11 | 0.08 |
| Lactone ring content (Y) (mol %) | 0.13 | 0.12 | 0.14 | 0.14 | 0.12 | 0.12 |

TABLE 2-continued

|  | Example 5 | Example 6 | Example 7 | Example 8 | Comparative Example 3 | Comparative Example 4 |
|---|---|---|---|---|---|---|
| Lactone ring content ratio (Y/Z) (mol %) | 62 | 61 | 64 | 62 | 52 | 61 |
| Lubricant content (ppm) | 100 | 100 | 100 | 100 | 100 | 400 |
| Thermal stability (° C.) | 362 | 362 | 365 | 369 | 343 | 357 |

The above results indicate that Examples, which satisfy the requirements of the present disclosure for the lactone ring content ratio (Y/Z) with respect to the sum (Z) of the carboxylic acid content (X) and the lactone ring content (Y) in the EVOH terminal structures and for the lubricant content, are excellent in high-temperature thermal stability. On the other hand, Comparative Example 3, which does not satisfy the requirement for the lactone ring content ratio (Y/Z), and Comparative Example 4, which does not satisfy the requirement for the lubricant content, are both poorer in thermal stability.

In the evaluation for the thermal stability, the thermal stability temperature is 362° C. to 369° C. in Examples 5 to 8, 343° C. in Comparative Example 3, and 357° C. in Comparative Example 4. Differences in thermal stability temperature between Examples and Comparative Examples are about 5° C. to about 26° C., which seem to be apparently small. However, the evaluation of the resin compositions for the thermal stability was performed on a much smaller scale than in practical applications. Therefore, the evaluation shows that the resin compositions of Examples are sufficiently superior in thermal stability in practical applications. More specifically, where a resin composition is used in an extruder in practical applications, the resin inevitably stagnates in an adapter, a feeding block, a die, and other mechanical structural portions of the extruder. The stagnating resin is liable to be exposed to conditions that are much severer than the aforementioned evaluation conditions. Therefore, it is considered that the differences between Examples and Comparative Examples in the evaluation are significantly enhanced in the practical applications.

<<(C) Use of Boron Compound as Thermally Stabilizing Substance>>

Example 9

A water/methanol mixed solution (having a water/methanol weight ratio of 35/65 and an EVOH resin concentration of 40%) of an ethylene-vinyl alcohol copolymer intermediate product having an ethylene content of 32 mol %, a saponification degree of 99.5 mol %, and an MFR of 12 g/10 minutes (measured at 210° C. with a load of 2160 g) was prepared. Then, the EVOH intermediate product was extruded into a strand form in a water bath containing cold water. The resulting strands were solidified, and then cut by a cutter, whereby cylindrical EVOH intermediate product pellets (having a water content of 100 parts based on 100 parts of the EVOH intermediate product) were produced.

After the EVOH intermediate product pellets were fed into an aqueous solution containing 350 ppm of acetic acid, 370 ppm of sodium acetate, 15 ppm of calcium dihydrogenphosphate, and 57 ppm of boric acid, and stirred at 30° C. to 35° C. for 1 hour, the aqueous solution was drained. Then, the aqueous solution prepared in the aforementioned manner was fed over the resulting EVOH intermediate product pellets, and stirred and drained in the aforementioned manner. This stirring process was repeatedly performed until the boric acid content of the EVOH intermediate product pellets fell within a range of 100 to 200 ppm on a boron basis (first-stage chemical treatment step). The weight-based concentration ratio of the carboxylic acid concentration to the metal ion concentration of the carboxylic acid metal salt in the aqueous solution used in the first-stage chemical treatment step (carboxylic acid concentration/metal ion concentration) was 3.0.

Then, the boron compound-incorporated EVOH intermediate product pellets thus produced were fed into an aqueous solution containing 700 ppm of acetic acid, 370 ppm of sodium acetate, 15 ppm of calcium dihydrogenphosphate, and 57 ppm of boric acid, and stirred at 30° C. to 35° C. for 4 hours, whereby the acetic acid content and the boric acid content of the EVOH intermediate product pellets were adjusted (second-stage chemical treatment step). The weight-based concentration ratio of the carboxylic acid concentration to the metal ion concentration of the carboxylic acid metal salt in the aqueous solution used in the second-stage chemical treatment step (carboxylic acid concentration/metal ion concentration) was 6.7.

The resulting (undried) EVOH intermediate product pellets were dried at 121° C. for 10 hours. Thus, an EVOH resin composition of the present disclosure was produced (in the form of pellets each having a diameter of 2.3 mm and a length of 2.4 mm). The measurement results for the EVOH resin composition thus produced are shown below in Table 3.

Example 10

An EVOH resin composition was produced in substantially the same manner as in Example 9, except that the amount of acetic acid contained in the aqueous solution used in the acetic acid amount adjusting step (second-stage chemical treatment step) was changed to 1,400 ppm and the weight-based concentration ratio of the carboxylic acid concentration to the metal ion concentration of the carboxylic acid metal salt in the aqueous solution used in the second-stage chemical treatment step (carboxylic acid concentration/metal ion concentration) was 13.5. The measurement results for the EVOH resin composition thus produced are shown below in Table 3.

Comparative Example 5

An EVOH resin composition was produced in substantially the same manner as in Example 9, except that the amount of acetic acid contained in the aqueous solution used in the second-stage chemical treatment step was changed to 350 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 3.4, and that the drying temperature in the drying step was changed to 118°

C. The measurement results for the EVOH resin composition thus produced are shown below in Table 3.

Comparative Example 6

An EVOH resin composition was produced in substantially the same manner as in Example 9, except that the amount of boric acid contained in the aqueous solution used in the second-stage chemical treatment step was changed to 550 ppm. The measurement results for the EVOH resin composition thus produced are shown below in Table 3.

a load of 2160 g) was prepared. Then, the EVOH intermediate product was dissolved in a water/methanol mixed solution (having a water/methanol weight ratio of 35/65), and the resulting EVOH intermediate product solution (having an EVOH resin concentration of 40%) was extruded into a strand form in a water bath containing cold water. The resulting strands were solidified, and then cut by a cutter, whereby cylindrical EVOH intermediate product pellets (having a water content of 100 parts based on 100 parts of the EVOH intermediate product) were produced.

TABLE 3

|  | Example 9 | Example 10 | Comparative Example 5 | Comparative Example 6 |
| --- | --- | --- | --- | --- |
| Carboxylic acid content (X) (mol %) | 0.09 | 0.08 | 0.11 | 0.09 |
| Lactone ring content (Y) (mol %) | 0.12 | 0.12 | 0.12 | 0.12 |
| Lactone ring content ratio (Y/Z) (mol %) | 57 | 60 | 52 | 57 |
| Boron compound content (on boron basis) (ppm) | 149 | 167 | 149 | 473 |
| Thermal stability (° C.) | 361 | 363 | 343 | 358 |

The above results indicate that Examples, which satisfy the requirements of the present disclosure for the lactone ring content ratio (Y/Z) with respect to the sum (Z) of the carboxylic acid content (X) and the lactone ring content (Y) in the EVOH terminal structures and for the boron compound content, are excellent in high-temperature thermal stability. On the other hand, Comparative Example 5, which does not satisfy the requirement for the lactone ring content ratio (Y/Z), and Comparative Example 6, which does not satisfy the requirement for the boron compound content, are both poorer in thermal stability.

In the evaluation for the thermal stability, the thermal stability temperature is 361° C. and 363° C. in Examples 9 and 10, respectively, 343° C. in Comparative Example 5, and 358° C. in Comparative Example 6. Differences in thermal stability temperature between Examples and Comparative Examples are 3° C. to 20° C., which seem to be apparently small. However, the evaluation of the resin compositions for the thermal stability was performed on a much smaller scale than in practical applications. Therefore, the evaluation shows that the resin compositions of Examples are sufficiently superior in thermal stability in practical applications. More specifically, where a resin composition is used in an extruder in practical applications, the resin inevitably stagnates in an adapter, a feeding block, a die, and other mechanical structural portions of the extruder. The stagnating resin is liable to be exposed to conditions that are much severer than the aforementioned evaluation conditions. Therefore, it is considered that the differences between Examples and Comparative Examples in the evaluation are significantly enhanced in the practical applications.

<<(D) Use of Conjugated Polyene Compound as Thermally Stabilizing Substance>>

Example 11

After polymerization of ethylene and vinyl acetate, a methanol solution containing sorbic acid as a conjugated polyene compound in a proportion shown below in Table 4 was added to a methanol paste of the resulting ethylene-vinyl acetate copolymer resin. Then, the resulting sorbic acid-containing resin paste was subjected to saponification, whereby an EVOH intermediate product having an ethylene content of 32 mol %, a saponification degree of 99.5 mol %, and an MFR of 12 g/10 minutes (measured at 210° C. with Subsequently, the EVOH intermediate product pellets were fed into an aqueous solution containing 350 ppm of acetic acid, 370 ppm of sodium acetate, 15 ppm of calcium dihydrogenphosphate, and 57 ppm of boric acid, and stirred at 30° C. to 35° C. for 1 hour. Then, this stirring process was performed five times by changing the aqueous solution (first-stage chemical treatment step). The weight-based concentration ratio of the carboxylic acid concentration to the metal ion concentration of the carboxylic acid metal salt in the aqueous solution used in the first-stage chemical treatment step (carboxylic acid concentration/metal ion concentration) was 3.0.

Then, the resulting EVOH intermediate product pellets were fed into an aqueous solution containing 2,450 ppm of acetic acid, 370 ppm of sodium acetate, 15 ppm of calcium dihydrogenphosphate, and 57 ppm of boric acid, and stirred at 30° C. to 35° C. for 4 hours, whereby the acetic acid content of the EVOH intermediate product pellets was adjusted (second-stage chemical treatment step). The weight-based concentration ratio of the carboxylic acid concentration to the metal ion concentration of the carboxylic acid metal salt in the aqueous solution used in the second-stage chemical treatment step (carboxylic acid concentration/metal ion concentration) was 23.6.

The resulting EVOH intermediate product pellets were dried at 121° C. for 10 hours. Thus, an EVOH resin composition of the present disclosure was produced (in the form of pellets each having a diameter of 2.3 mm and a length of 2.4 mm). The measurement results for the EVOH resin composition thus produced are shown below in Table 4.

Example 12

An EVOH resin composition was produced in substantially the same manner as in Example 11, except that the sorbic acid content of the EVOH resin composition was adjusted as shown below in Table 4 and the drying temperature in the EVOH intermediate product pellet drying step was changed to 150° C. The measurement results for the EVOH resin composition thus produced are shown below in Table 4.

Example 13

An EVOH resin composition was produced in substantially the same manner as in Example 11, except that the sorbic acid content of the EVOH resin composition was adjusted as shown below in Table 4, that the amount of acetic acid contained in the aqueous solution used in the second-stage chemical treatment step was changed to 3,500 ppm, and that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7. The measurement results for the EVOH resin composition thus produced are shown below in Table 4.

adjusted as shown below in Table 4. The measurement results for the EVOH resin composition thus produced are shown below in Table 4.

TABLE 4

|  | Example 11 | Example 12 | Example 13 | Example 14 | Comparative Example 7 | Comparative Example 8 |
| --- | --- | --- | --- | --- | --- | --- |
| Carboxylic acid content (X) (mol %) | 0.08 | 0.08 | 0.08 | 0.09 | 0.11 | 0.08 |
| Lactone ring content (Y) (mol %) | 0.13 | 0.12 | 0.14 | 0.14 | 0.12 | 0.14 |
| Lactone ring content ratio (Y/Z) (mol %) | 62 | 61 | 64 | 62 | 52 | 64 |
| Sorbic acid content (ppm) | 210 | 140 | 220 | 140 | 180 | 1000 |
| Thermal stability (° C.) | 363 | 362 | 363 | 363 | 332 | 361 |
| Post-heating colorization degree (%) | 0 | 2.3 | 0 | 1.4 | 0 | 60.1 |

Example 14

An EVOH resin composition was produced in substantially the same manner as in Example 11, except that the sorbic acid content of the EVOH resin composition was adjusted as shown below in Table 4, that the amount of acetic acid contained in the aqueous solution used in the second-stage chemical treatment step was changed to 3,500 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7, and that the drying temperature in the EVOH intermediate product pellet drying step was changed to 150° C. The measurement results for the EVOH resin composition thus produced are shown below in Table 4.

Comparative Example 7

An EVOH resin composition was produced in substantially the same manner as in Example 11, except that the sorbic acid content of the EVOH resin composition was adjusted as shown below in Table 4, that the amount of acetic acid contained in the aqueous solution used in the second-stage chemical treatment step was changed to 350 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 3.4, and that the drying temperature in the EVOH intermediate product pellet drying step was changed to 118° C. The measurement results for the EVOH resin composition thus produced are shown below in Table 4.

Comparative Example 8

An EVOH resin composition was produced in substantially the same manner as in Example 13, except that the sorbic acid content of the EVOH resin composition was The above results indicate that Examples, which satisfy the requirements of the present disclosure for the lactone ring content ratio (Y/Z) with respect to the sum (Z) of the carboxylic acid content (X) and the lactone ring content (Y) in the EVOH terminal structures and for the sorbic acid content (conjugated polyene compound content), are excellent in high-temperature thermal stability, and completely or substantially free from the post-heating coloration. On the other hand, Comparative Example 7, which does not satisfy the requirement for the lactone ring content ratio (Y/Z), is poorer in thermal stability, and Comparative Example 8, which does not satisfy the requirement for the sorbic acid content, suffers from post-heating coloration. In the evaluation for the thermal stability, the thermal stability temperature is 362° C. to 363° C. in Examples 11 to 14, and 332° C. in Comparative Example 7. Differences in thermal stability temperature between Examples and Comparative Example are about 30° C. The differences not less than 30° C. at higher temperatures are significant from the viewpoint of reaction kinetics, because the oxidative degradation and the thermal decomposition of the resin occur due to chemical reactions and, in general, the reaction rates of the chemical reactions are exponentially increased with the temperature increase.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The EVOH resin composition of the present disclosure contains the EVOH in which the lactone ring content ratio with respect to the sum of the carboxylic acid content and the lactone ring content is adjusted within the predetermined range, and further contains a limited proportion of the specific thermally stabilizing substance. Therefore, the EVOH resin composition is excellent in high-temperature thermal decomposition suppressing effect and thermal stability, and is free from odor emanation and coloration even if being processed at a higher temperature. The EVOH resin composition of the present disclosure can be formed into cups, trays, tubes, and other containers, and the stretched film formed from the EVOH resin composition can be formed into bags and caps. These packaging materials can be widely used for packaging foods, beverages, pharmaceutical products, cosmetics, industrial chemicals, detergents, agricultural chemicals, fuels, and the like.

The invention claimed is:

1. An ethylene-vinyl alcohol copolymer resin composition comprising:
    an ethylene-vinyl alcohol copolymer; and
    from 5 ppm to 500 ppm of a cinnamic acid component based on a weight of the ethylene-vinyl alcohol copolymer resin composition;
    wherein the ethylene-vinyl alcohol copolymer comprises monomer units including at least an ethylene unit and a vinyl alcohol unit, and a carboxylic acid group and a lactone ring present in terminal structures thereof, and a ratio (Y/Z) of a lactone ring content (Y) to a sum (Z) of a carboxylic acid content (X) and the lactone ring content (Y) is not less than 55% in a molar ratio.

2. The ethylene-vinyl alcohol copolymer resin composition according to claim 1, wherein the sum (Z) of the carboxylic acid content (X) and the lactone ring content (Y) is 0.01 to 0.3 mol % based on a total amount of the monomer units of the ethylene-vinyl alcohol copolymer.

3. The ethylene-vinyl alcohol copolymer resin composition according to claim 1, wherein the lactone ring content (Y) is 0.01 to 0.3 mol % based on the total amount of the monomer units of the ethylene-vinyl alcohol copolymer.

4. The ethylene-vinyl alcohol copolymer resin composition according to claim 1, wherein the carboxylic acid content (X) is 0.01 to 0.3 mol % based on the total amount of the monomer units of the ethylene-vinyl alcohol copolymer.

5. A multilayer structure comprising a plurality of layers at least one of which comprises the ethylene-vinyl alcohol copolymer resin composition according to claim 1.

6. An ethylene-vinyl alcohol copolymer resin composition comprising:
    an ethylene-vinyl alcohol copolymer; and
    from 5 ppm to 300 ppm of a lubricant based on the weight of the ethylene-vinyl alcohol copolymer resin composition;
    wherein the ethylene-vinyl alcohol copolymer comprises monomer units including at least an ethylene unit and a vinyl alcohol unit, and a carboxylic acid group and a lactone ring present in terminal structures thereof, and a ratio (Y/Z) of a lactone ring content (Y) to a sum (Z) of a carboxylic acid content (X) and the lactone ring content (Y) is not less than 55% in a molar ratio.

7. The ethylene-vinyl alcohol copolymer resin composition according to claim 6, wherein the sum (Z) of the carboxylic acid content (X) and the lactone ring content (Y) is 0.01 to 0.3 mol % based on a total amount of the monomer units of the ethylene-vinyl alcohol copolymer.

8. The ethylene-vinyl alcohol copolymer resin composition according to claim 6, wherein the lactone ring content (Y) is 0.01 to 0.3 mol % based on the total amount of the monomer units of the ethylene-vinyl alcohol copolymer.

9. The ethylene-vinyl alcohol copolymer resin composition according to claim 6, wherein the carboxylic acid content (X) is 0.01 to 0.3 mol % based on the total amount of the monomer units of the ethylene-vinyl alcohol copolymer.

10. A multilayer structure comprising a plurality of layers at least one of which comprises the ethylene-vinyl alcohol copolymer resin composition according to claim 6.

11. An ethylene-vinyl alcohol copolymer resin composition comprising:
    an ethylene-vinyl alcohol copolymer; and
    from 5 ppm to 400 ppm of a boron compound on a boron basis based on the weight of the ethylene-vinyl alcohol copolymer resin composition;
    wherein the ethylene-vinyl alcohol copolymer comprises monomer units including at least an ethylene unit and a vinyl alcohol unit, and a carboxylic acid group and a lactone ring present in terminal structures thereof, and a ratio (Y/Z) of a lactone ring content (Y) to a sum (Z) of a carboxylic acid content (X) and the lactone ring content (Y) is not less than 55% in a molar ratio.

12. The ethylene-vinyl alcohol copolymer resin composition according to claim 11, wherein the sum (Z) of the carboxylic acid content (X) and the lactone ring content (Y) is 0.01 to 0.3 mol % based on a total amount of the monomer units of the ethylene-vinyl alcohol copolymer.

13. The ethylene-vinyl alcohol copolymer resin composition according to claim 11, wherein the lactone ring content (Y) is 0.01 to 0.3 mol % based on the total amount of the monomer units of the ethylene-vinyl alcohol copolymer.

14. The ethylene-vinyl alcohol copolymer resin composition according to claim 11, wherein the carboxylic acid content (X) is 0.01 to 0.3 mol % based on the total amount of the monomer units of the ethylene-vinyl alcohol copolymer.

15. A multilayer structure comprising a plurality of layers at least one of which comprises the ethylene-vinyl alcohol copolymer resin composition according to claim 11.

16. An ethylene-vinyl alcohol copolymer resin composition comprising:
    an ethylene-vinyl alcohol copolymer; and
    from 5 ppm to 800 ppm of a conjugated polyene compound based on the weight of the ethylene-vinyl alcohol copolymer resin composition,
    wherein the ethylene-vinyl alcohol copolymer comprises monomer units including at least an ethylene unit and a vinyl alcohol unit, and a carboxylic acid group and a lactone ring present in terminal structures thereof, and a ratio (Y/Z) of a lactone ring content (Y) to a sum (Z) of a carboxylic acid content (X) and the lactone ring content (Y) is not less than 55% in a molar ratio.

17. The ethylene-vinyl alcohol copolymer resin composition according to claim 16, wherein the sum (Z) of the carboxylic acid content (X) and the lactone ring content (Y) is 0.01 to 0.3 mol % based on a total amount of the monomer units of the ethylene-vinyl alcohol copolymer.

18. The ethylene-vinyl alcohol copolymer resin composition according to claim 16, wherein the lactone ring content (Y) is 0.01 to 0.3 mol % based on the total amount of the monomer units of the ethylene-vinyl alcohol copolymer.

19. The ethylene-vinyl alcohol copolymer resin composition according to claim 16, wherein the carboxylic acid content (X) is 0.01 to 0.3 mol % based on the total amount of the monomer units of the ethylene-vinyl alcohol copolymer.

20. A multilayer structure comprising a plurality of layers at least one of which comprises the ethylene-vinyl alcohol copolymer resin composition according to claim 16.

* * * * *